United States Patent [19]
Hart et al.

[11] Patent Number: 5,634,696
[45] Date of Patent: Jun. 3, 1997

[54] RAILWAY BRAKE PIPE BRACKET WITH ACCESS PORTS

[76] Inventors: James E. Hart, 163 Autumn Dr., Trafford, Pa. 15085; Gary M. Sich, 117 Maplewood Dr., Irwin, Pa. 15642; Gregory L. Johnston, 621 E. 8th Ave., Tarentum, Pa. 15084

[21] Appl. No.: 547,929

[22] Filed: Oct. 25, 1995

Related U.S. Application Data

[63] Continuation-in-part of Ser. No. 306,790, Sep. 15, 1994, Pat. No. 5,480,218, and a continuation-in-part of Ser. No. 396,815, Mar. 2, 1995, Pat. No. 5,509,727.

[51] Int. Cl.$^6$ .................................................. B60T 15/22
[52] U.S. Cl. ........................ 303/28; 303/63; 285/131
[58] Field of Search ................................ 308/1, 28, 33, 308/35, 36, 37, 38, 82, 86, 81, 39, 74, 69; 138/109; 137/347, 349, 594; 285/131, 137.1, 63, 163, 158

[56] References Cited

U.S. PATENT DOCUMENTS

| | | |
|---|---|---|
| 1,309,787 | 7/1919 | Turner . |
| 2,087,623 | 7/1937 | Canetta et al. . |
| 2,464,977 | 3/1949 | Gorman . |
| 2,802,701 | 8/1957 | McClure . |
| 3,022,117 | 2/1962 | Hewitt . |
| 3,160,446 | 12/1964 | McClure et al. . |
| 3,716,276 | 2/1973 | Wilson et al. . |
| 3,734,575 | 5/1973 | Paginton . |
| 3,944,264 | 3/1976 | Mong et al. . |
| 4,033,632 | 7/1977 | Wilson . |
| 4,171,559 | 10/1979 | Vyse et al. . |
| 4,188,071 | 2/1980 | Hart . |
| 4,611,831 | 9/1986 | Truchet . |
| 4,726,628 | 2/1988 | Vaughn ............................ 303/63 |
| 4,770,472 | 9/1988 | Weber, Jr. et al. . |
| 4,830,438 | 5/1989 | Hart et al. . |
| 5,297,820 | 3/1994 | Martin . |
| 5,451,099 | 9/1995 | Hart et al. ...................... 303/28 |

FOREIGN PATENT DOCUMENTS

| | | |
|---|---|---|
| 0006239 | 6/1979 | Germany . |
| 3011226 | 10/1981 | Germany . |

OTHER PUBLICATIONS

Booklet 5062 entitled "The AB Freight Car Air Brake Equipment with the AB Control Valve", issued Dec. 1975 by the Westinghouse Air Brake Division of American Standard Inc., Wilmerding, PA.

A paper entitled "The Third Generation Brake Cylinder Release Valve", presented at the annual meeting of the Air Brake Association, Oct. 1963 by H.N. Sudduth of the New York Air Brake Company of Watertown, NY, cover and pp. 1–11.

P.p. 27, 29, 30, 31 and 23 of AAR specification 2518 published by American Association of Railroads, Washington, D.C., date unknown but acknowledged to be prior art to the present application.

Booklet 5062-19 entitled "AB Single Capacity Freight Car Air Brake Equipment with the ADBX Type control Valves" published Aug. 1991 by Westinghouse Air Brake Company, Wilmerding, PA.

"Code of Air Brake System Tests for Freight Equipment", Association of American Railroads, Nov. 1992.

*Primary Examiner*—Matthew C. Graham

[57] ABSTRACT

A pipe bracket for use in a freight brake control valve on a railway freight vehicle is provided. Four access ports are preferably provided on a first side of the pipe bracket. The freight car piping, including a brake pipe, brake cylinder line, emergency reservoir line and an auxiliary reservoir line are connected to a second side of the pipe bracket. The freight brake control valve further includes an service portion coupled with a third side of the pipe bracket and an emergency portion coupled with a fourth side of the pipe bracket. A plurality of passageways are included within the pipe bracket for providing fluid communication from the freight car piping to the service portion and the emergency portion. The access ports are preferably connected to each of the passageways within the pipe bracket to permit testing of the fluid pressures within the passageways.

17 Claims, 22 Drawing Sheets

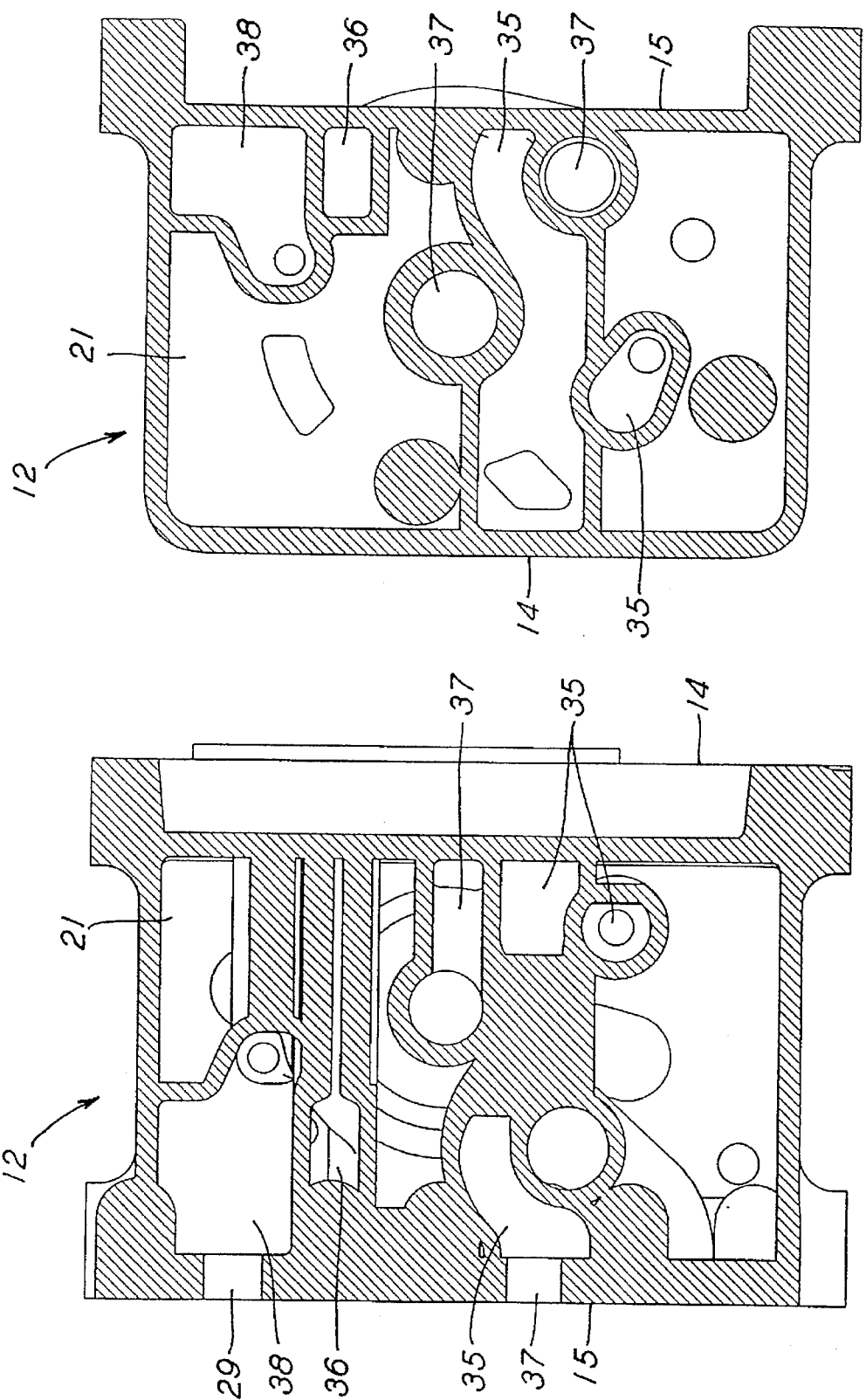

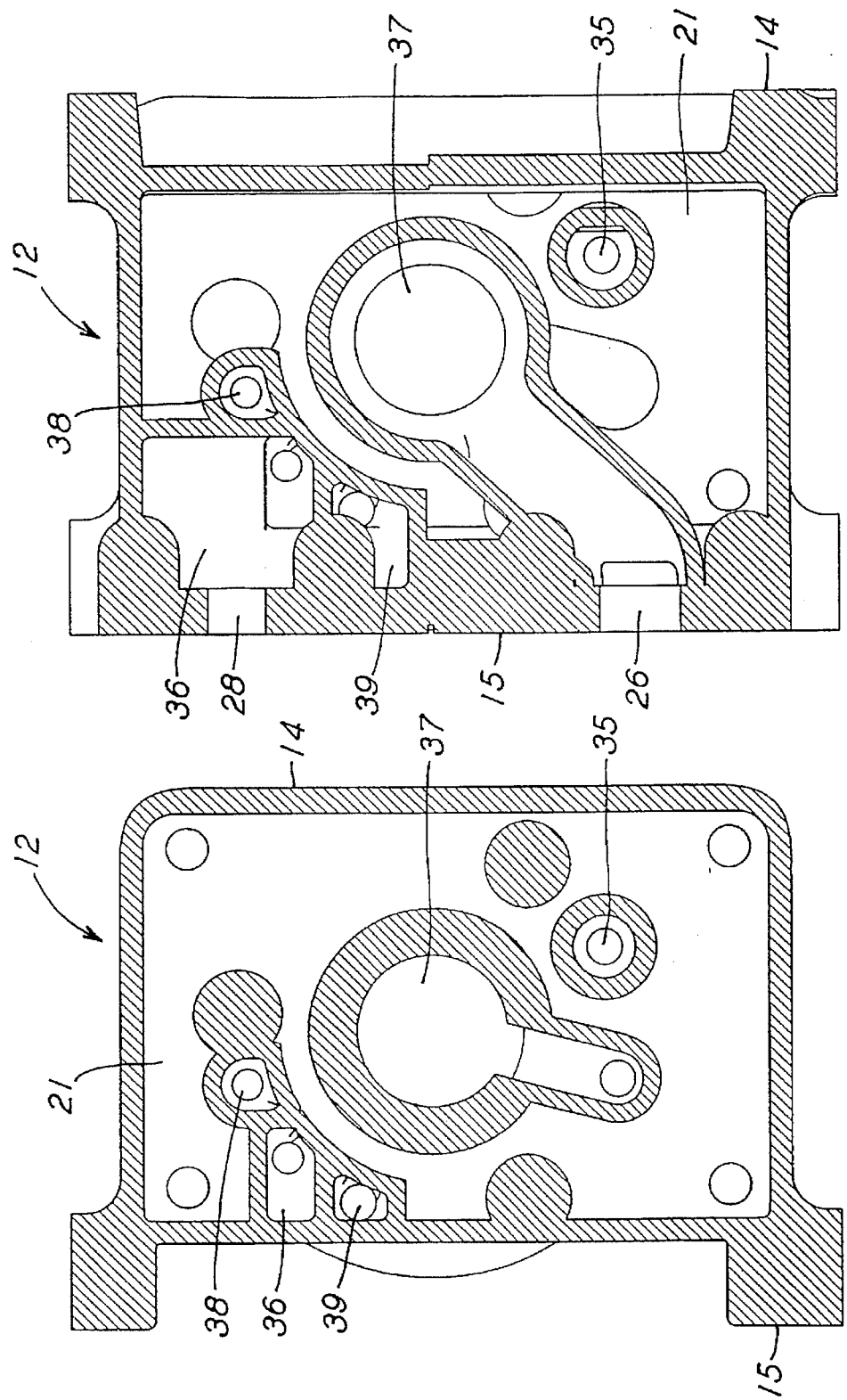

RAILWAY BRAKE PIPE BRACKET WITH ACCESS PORTS

RELATED APPLICATION

This is a continuation-in-part of application Ser. No. 08/306,790, filed Sep. 15, 1994, now U.S. Pat. No. 5,480,218, which is incorporated herein by reference, and a continuation-in-part of application Ser. No. 08/396,815, filed Mar. 2, 1995, now U.S. Pat. No. 5,509,727, which is incorporated herein by reference.

BACKGROUND OF THE INVENTION

1. Field of the Invention

This invention relates generally to brake control valve devices for railway cars and more particularly to a pipe bracket portion of said brake control valve devices having a plurality of access ports for directly accessing fluid lines and determining the pressures thereof.

2. Description of the Prior Art

Typical freight control valves such as the ABD, ABDW, DB-60 and ABDX control valves include a pipe bracket portion having a service portion and an emergency portion mounted on opposite sides or faces of the pipe bracket. Such a typical control valve assembly is shown in prior art diagrammatic FIG. 1. One such prior art pipe bracket is known as the type AB pipe bracket. Typically, a second side, the rear, of the pipe bracket portion has a number of locations for connecting the pipe bracket portion to the piping of the freight car. These rear connections typically include connections to the brake pipe, the brake cylinder retaining valve, the brake cylinder, the emergency reservoir and the auxiliary reservoir. The pipe bracket connection to the pneumatic piping permits the pipe bracket to provide the necessary communication of fluid pressures to both the service portion and emergency portions in addition to the brake cylinder and reservoir.

Most type AB pipe brackets only have connections to pipe lines on their rear surface. However, some older AB pipe brackets manufactured prior to 1975 may have included a pipe flange pad for a brake cylinder release and/or a pipe flange pad for the number 11 port. This number 11 port could be used as a source of auxiliary air to operate pneumatic devices. Port 11 is shown in the Westinghouse Air Brake Brochure No. 5062 titled "The AB Freight Car Air Brake Equipment With AB Control Valve" dated December 1975. Specifically, the AB control valve shown on page 2 shows a cover bolted over port 11 with two bolts on the front surface of the pipe bracket portion. Port 11 is connected to the brake pipe in such older style AB pipe brackets. Further, some older style AB pipe brackets may in addition to port 11 include a flange pad for a brake cylinder release valve with ports to the brake cylinder and exhaust. Such valves were known as type QR, QRR or QRB; and had two or three ports (in addition to the number 11 port) on the front of the pipe bracket. The pipe brackets with four ports included two ports to the brake cylinder air and one port to the retaining valve, and a number 11 port to the brake pipe.

It is sometimes necessary to tap into the fluid lines for the purpose of obtaining pressure measurements of the fluid within the freight car piping. However, one must access the area behind the pipe bracket, the second side, which contains the connections of the pipe bracket to the piping of the freight car.

Accessing the area behind the pipe bracket is frequently difficult depending upon the placement of the brake control valve on the freight car. In addition, the connections between the pipe bracket and freight car piping would then be broken to allow monitoring of the pressures.

SUMMARY OF THE INVENTION

The invention provides for a pipe bracket portion which facilitates access to the passageways within the freight brake control valve, specifically the pipe bracket portion, for monitoring the state of a fluid therein. Regarding the copending parent application Ser. No. 08/306,790 which relates to single sided pipe brackets, the present invention relates to conventional pipe brackets, such as type AB, wherein the emergency portion and service portion are mounted on opposite sides of the pipe bracket portion.

The pipe bracket portion in accordance with the present invention provides direct access to the passageways through the front of the freight brake control valve thereby eliminating the need to access the rear area of the freight brake control valve.

The pipe bracket portion includes a first side and an opposingly oriented second side. A first side includes at least four access ports for providing access to the passageways within the pipe bracket portion and the second side includes connectors for coupling the freight car piping (brake pipe, brake cylinder line, emergency reservoir line and auxiliary reservoir line) with the pipe bracket portion. The pipe bracket portion includes a third side and an opposingly oriented fourth side, and the third side and the fourth side are coupled with the service portion and emergency portion, respectively. The passageways within the pipe bracket portion provide fluid communication between the freight car piping and the service portion and the emergency portion.

In some embodiments, an access housing is fixed to the access ports. Such housing may have check valves to contain the fluid pressure within the passageways when the valve is "closed".

When the fluid pressure within any or all of the passageways is to be tested, an adapter connected to a test device is preferably engaged with the access housing, thereby "opening" the valve and allowing the fluid under pressure to enter the adapter. Connections provided on the adapter may then lead to the pressure testing device so that the fluid pressure within the passageways may be analyzed. Such testing is discussed in incorporated patent application Ser. No. 08/396, 815.

Providing access ports on the first side of the pipe bracket enables testing of the fluid pressures within the pipe bracket without having to remove the freight brake control valve from the car or the service portion or emergency portion from the pipe bracket portion. In addition, the access ports on the pipe bracket portion provide access to the pipe bracket passageways without having to disconnect the normal fluid lines connected to the rear pipe bracket portion.

When the adapter is removed from the access housing, the valve acts as a primary seal by sealing the access housing and preventing fluid pressure from being lost. The adapter may be provided with a cam system or other means for moving the extending members into and out of the access housing so as to move the valve into and out of the "open" position.

It is preferred that once the adapter is removed from the housing and the fluid pressures within the passageways are not being tested, a removable outer cover be placed over the access housing to assist in sealing the access housing, and for preventing the entry of dirt or foreign material into the passageways.

When the fluid pressures within the passageways are not being tested, the housing may be removed from the pipe bracket portion. Once the housing is removed, a primary seal cover may be attached directly to the pipe bracket portion at the access ports, sealing the individual ports and preventing fluid pressure from exiting the access ports.

It is further preferred that at least four access ports be utilized for communicating with each of the brake pipe, the brake cylinder, the emergency reservoir and the auxiliary reservoir. A quick action chamber (QAC) is additionally provided in the pipe bracket portion. It is preferred in some embodiments that a quick action chamber access port be provided for communicating to the quick action chamber.

Other objects and advantages of the invention will become apparent from a description of certain present preferred embodiments thereof shown in the drawings.

DETAILED DESCRIPTION OF THE PREFERRED EMBODIMENTS

Figure 1:
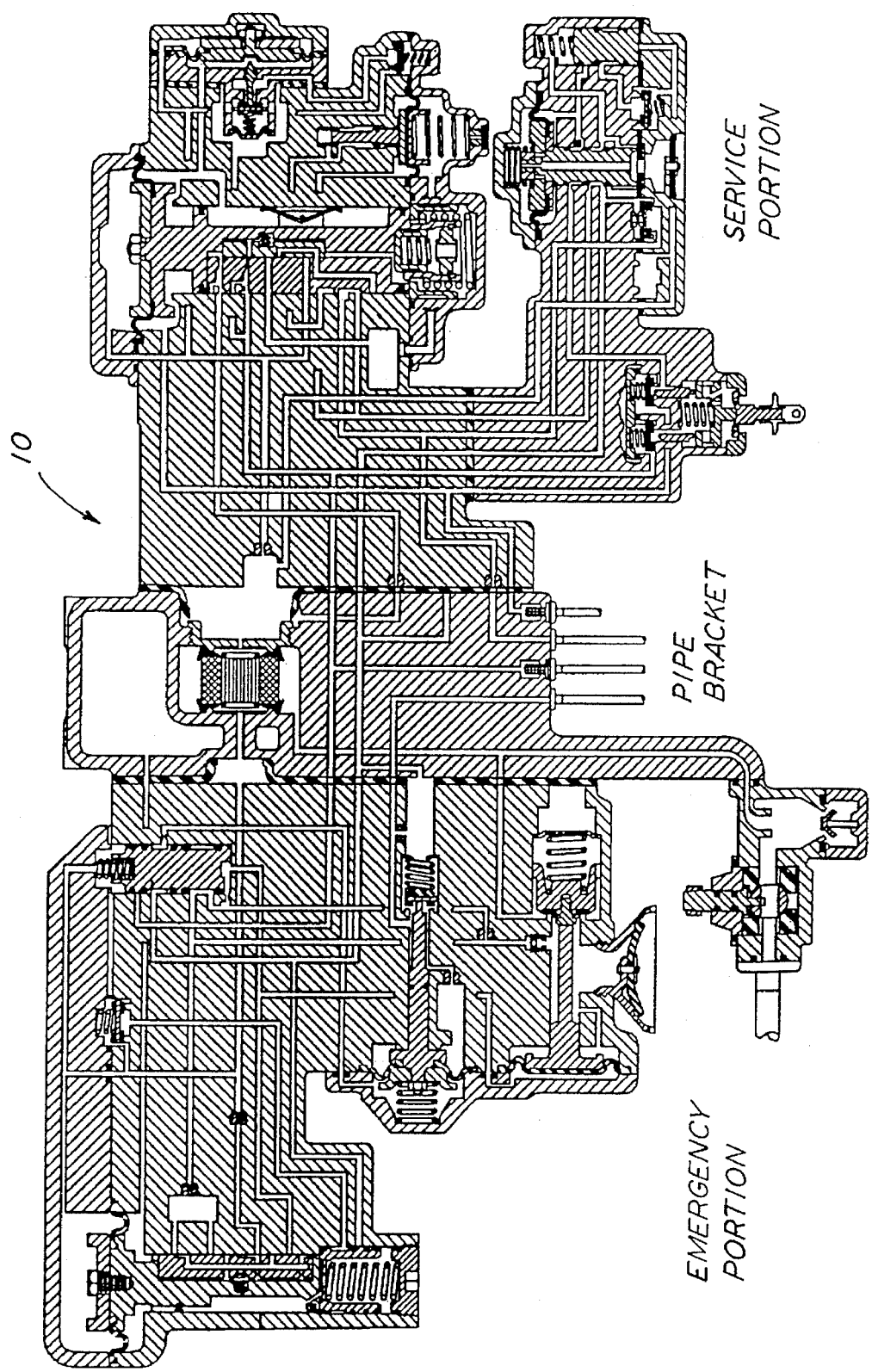
FIG. 1 is a prior art schematic of a railway freight brake control valve showing a pipe bracket portion, emergency portion and service portion and the passageways therein.

Freight brake control valves 10 usually include a service portion 18 and a pipe bracket portion 12 and an emergency portion 20. Freight car piping is conventionally coupled with the pipe bracket portion of the freight brake control valve 10 at the rear of the pipe bracket. As shown in FIG. 1, fluid passageways of a conventional pipe bracket portion connect the freight car piping with the service portion and emergency portion of the freight brake control valve 10.

Figure 2:
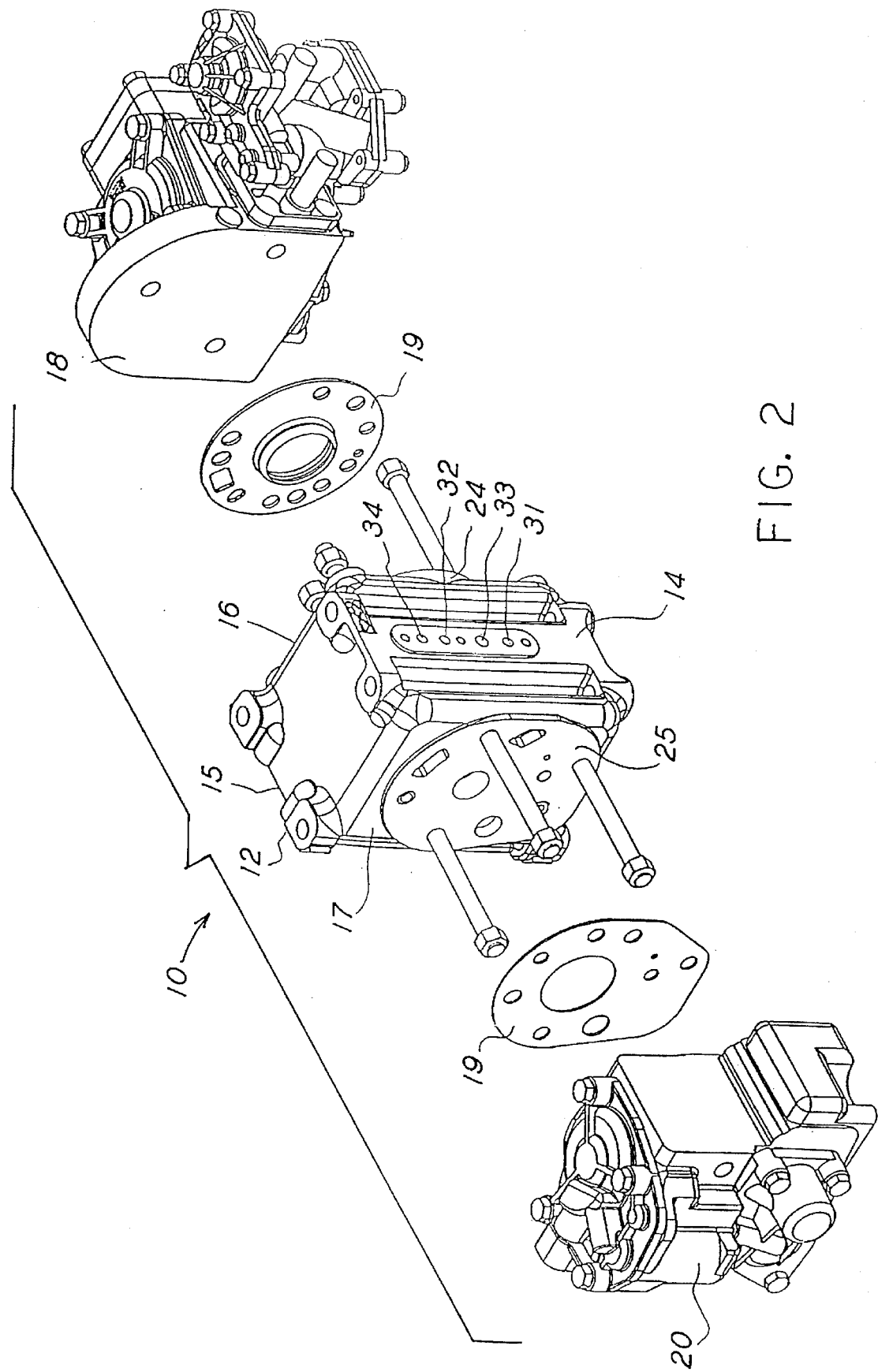
FIG. 2 is an exploded perspective view of the service portion, emergency portion and the preferred pipe bracket portion.

FIG. 2 is an exploded view of a freight brake control valve 10 showing a pipe bracket portion 12 in accordance with the present invention interposed between the service portion 18 and emergency portion 20. Gaskets 19 are preferably placed between the pipe bracket portion 12 and each of the service portion 18 and the emergency portion 20. The pipe bracket portion 12 includes a first side 14 and an opposingly oriented second side 15, and a third side 16 and an opposingly oriented fourth side 17.

The third side 16 includes a service portion mounting 24 and the fourth side 17 includes an emergency portion mounting 25. The service portion 18 and emergency portion 20 may be attached to the service portion mounting 24 and the emergency portion mounting 25, respectively, by any suitable means including threaded bolts or studs.

The freight car piping, including a brake pipe, brake cylinder line, brake cylinder retaining valve line, an emergency reservoir line and an auxiliary reservoir line (each not shown in FIG. 2), is connected with the pipe bracket portion 12 at the second side 15 thereof by any suitable means including flanged fittings.

Figure 3:
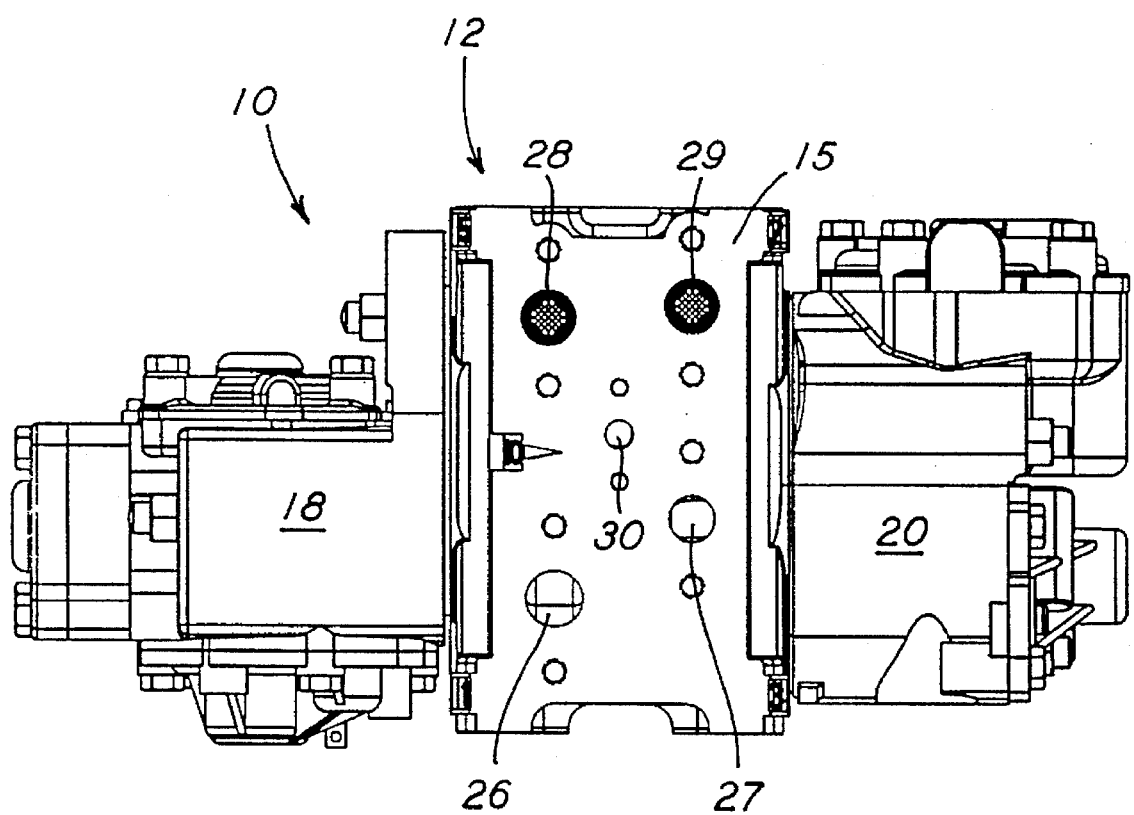
FIG. 3 is a rear view of a freight brake control valve having the preferred pipe bracket portion interposed between the service portion and emergency portion.

As shown in FIG. 3, the second side 15 of the pipe bracket portion 12 includes a plurality of ports to provide fluid communication of the pipe bracket 12 with the freight car piping. The ports include a brake pipe port 26, brake cylinder port 27, auxiliary reservoir port 28, emergency reservoir port 29 and a brake cylinder retaining valve port 30, thereby providing fluid communication of the pipe bracket portion 12 with the brake pipe, brake cylinder line, auxiliary reservoir line, emergency reservoir line, and brake cylinder retaining valve line.

Figure 4:
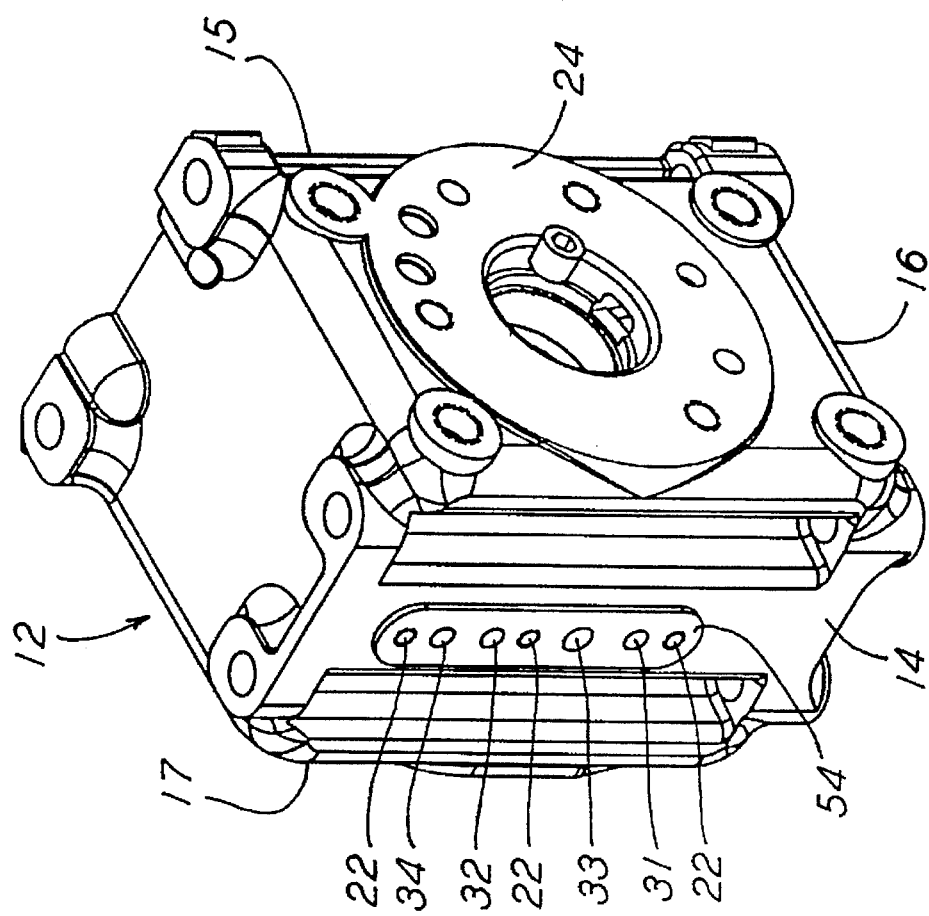
FIG. 4 is a perspective view of the pipe bracket portion in accordance with the present invention.

The first side 14 of the pipe bracket portion 12 includes a plurality of access ports 31, 32, 33, 34 as shown in FIG. 4. The access ports 31, 32, 33, 34 provide fluid communication with a plurality of passageways 35, 36, 37, 38 within the pipe bracket 12. In particular, a brake cylinder access port 31 connects to the brake cylinder passageway 35, an auxiliary reservoir access port 32 connects to the auxiliary reservoir passageway 36, a brake pipe access port 33 connects to the brake pipe passageway 37, and the emergency reservoir access port 34 connects to the emergency reservoir passageway 38 (the passageways are not shown in FIG. 4). Each internal passageway in the pipe bracket 12 communicates with a respective freight car piping line coupled with the pipe bracket portion 12.

The access ports 31, 32, 33, 34 are located upon a mounting surface or boss 54 on the first side 14 of the pipe bracket portion 12. As shown in FIG. 4, the access ports 31, 32, 33, 34 are preferably linearly arranged in a vertical line on the boss 54. The boss 54 is preferably integral with the pipe bracket portion 12 and preferably has a planar surface. Threaded bolt holes 22 are also preferably provided on the boss 54.

Providing access ports 31, 32, 33, 34 on the first side 14 of the pipe bracket 12 enables testing of the fluid pressures within the pipe bracket 12 without having to remove the freight brake control valve 10 from the car or the service portion 18 or emergency portion 20 from the pipe bracket portion 12. In addition, the access ports 31, 32, 33, 34 on the pipe bracket portion 12 provide access to the pipe bracket passageways 35, 36, 37, 38 without having to disconnect the normal fluid lines connected to the second side 15 of the pipe bracket portion 12.

Figure 5A:
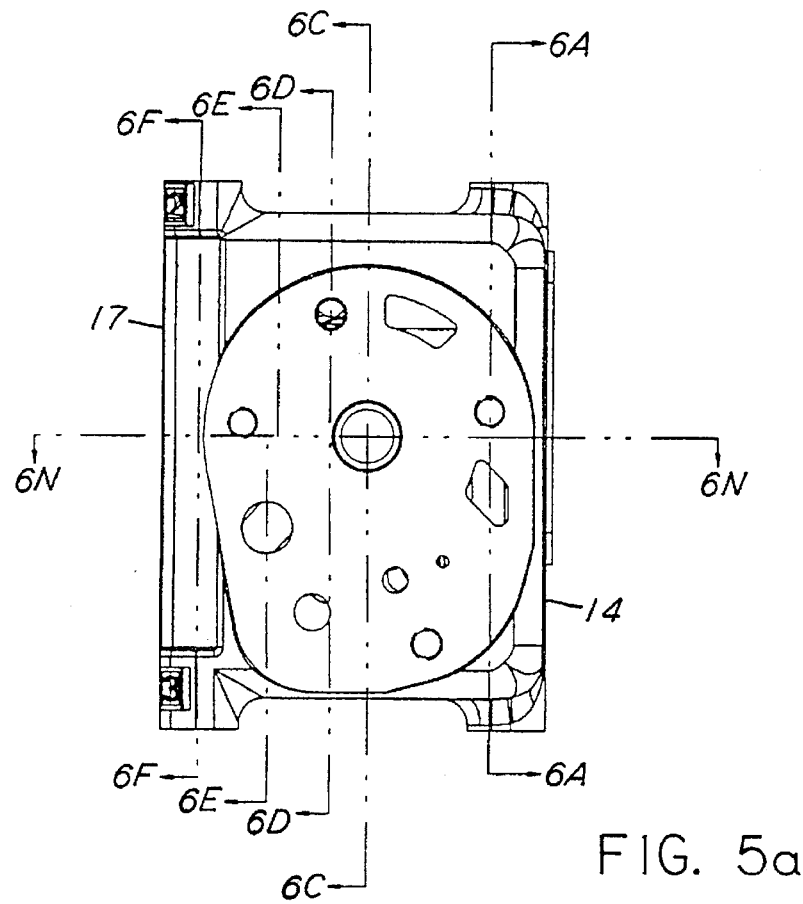
FIGS. 5a, 5b, 5c and 5d are respective service portion side, front, emergency portion side and rear views of the pipe bracket portion in accordance with the present invention.
Figure 5B:
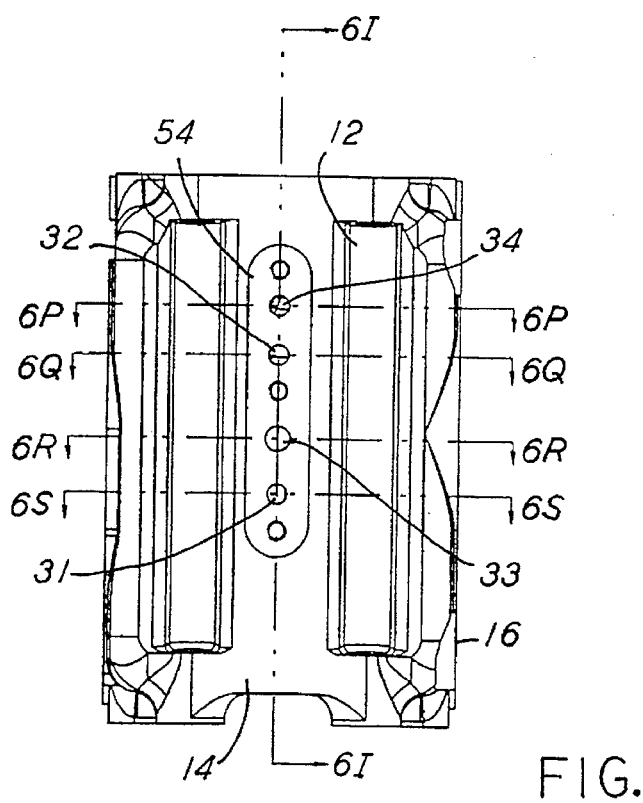
Figure 5C:
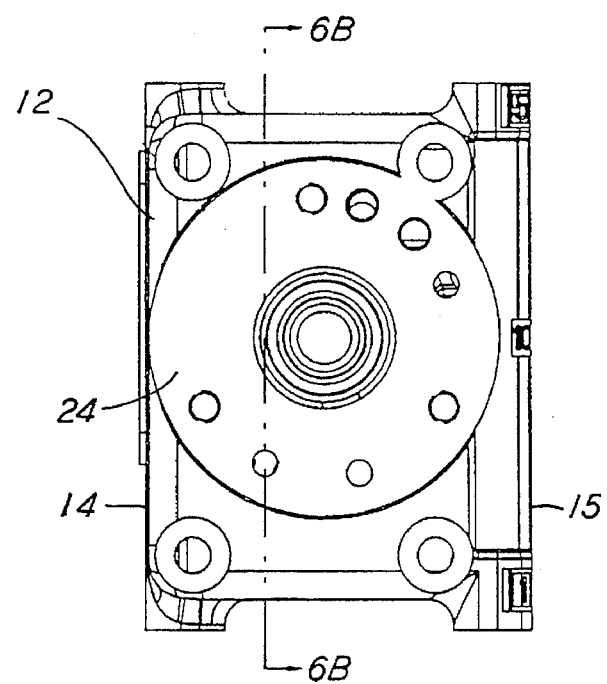
Figure 5D:
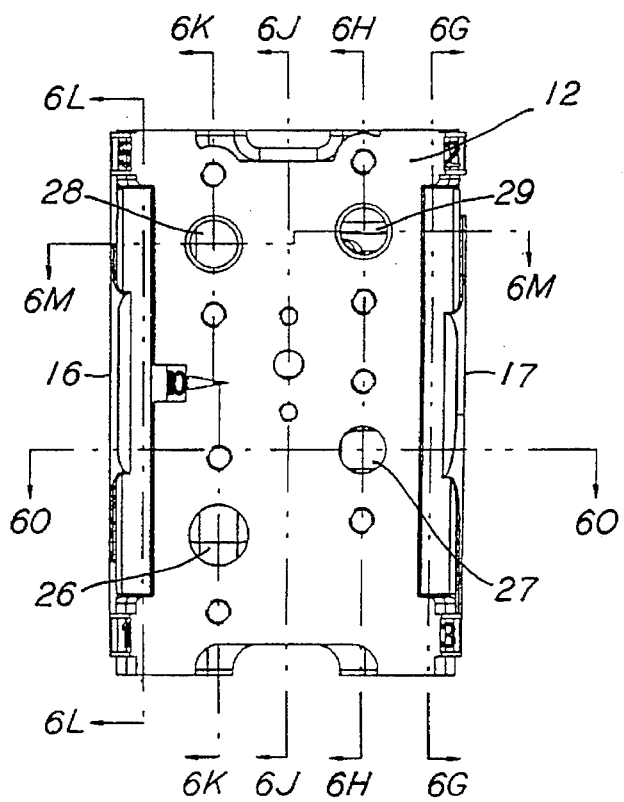

FIGS. 5a, 5b, 5c and 5d are views of the pipe bracket 12 in accordance with the present invention. In particular, FIG. 5a is a side view of the pipe bracket 12 showing the emergency portion mounting 25. FIG. 5b is a front view of the pipe bracket 12 showing the access ports 31, 32, 33, 34. FIG. 5c is a side view of the pipe bracket 12 showing the service portion mounting 24. FIG. 5d is a rear view showing the ports 26, 27, 28, 29, 30 for coupling the pipe bracket 12 with the freight car piping.

Figure 6A:
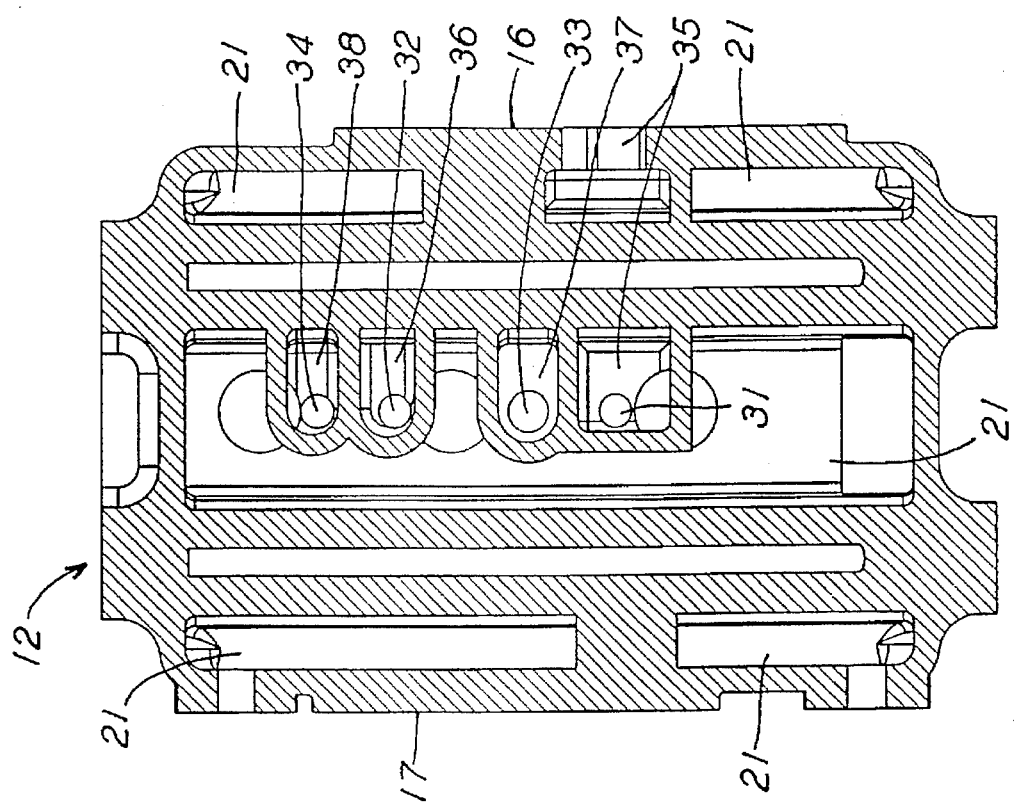
FIGS. 6a, 6b, 6c, 6d, 6e, 6f, 6g, 6h, 6i, 6j, 6k, 6l, 6m, 6n, 6o, 6p, 6q, and 6r are cross-sectional views of the preferred pipe bracket portion taken along lines as shown in FIGS. 5a, 5b, 5c and 5d.
Figure 6B:
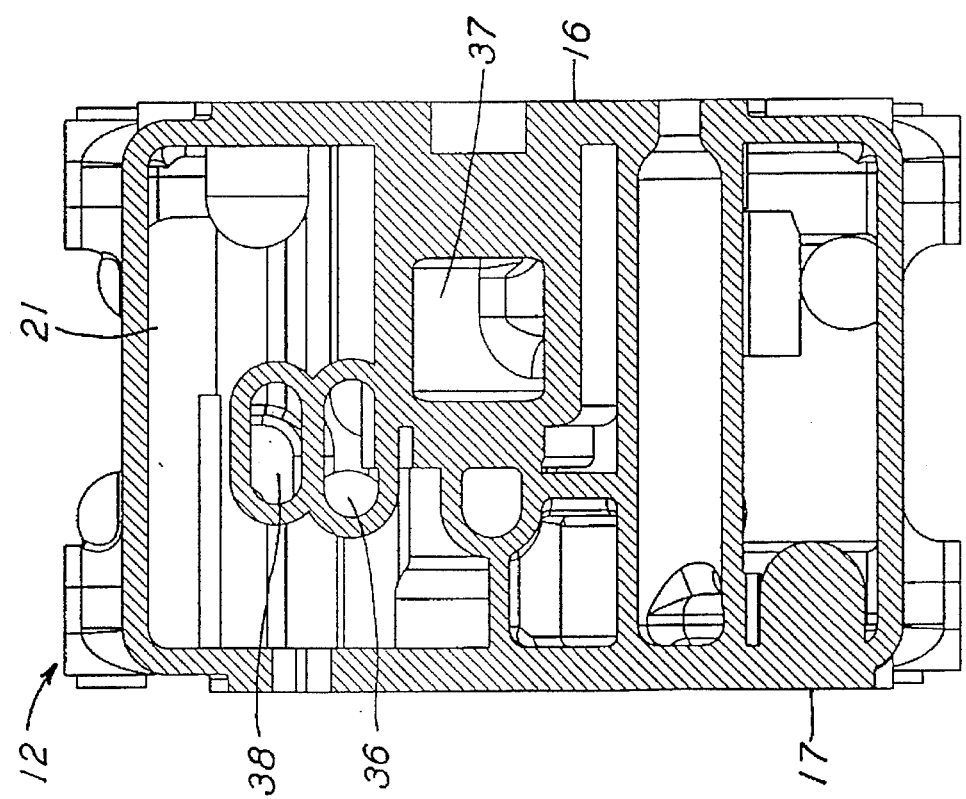
Figure 6C:
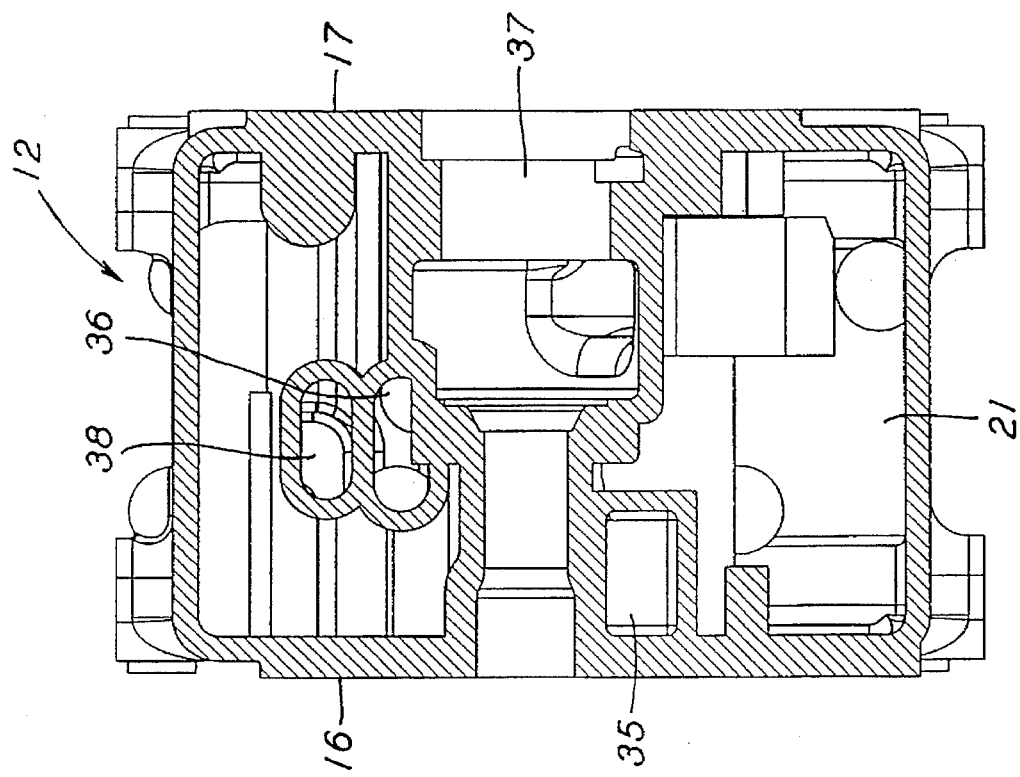
Figure 6F:
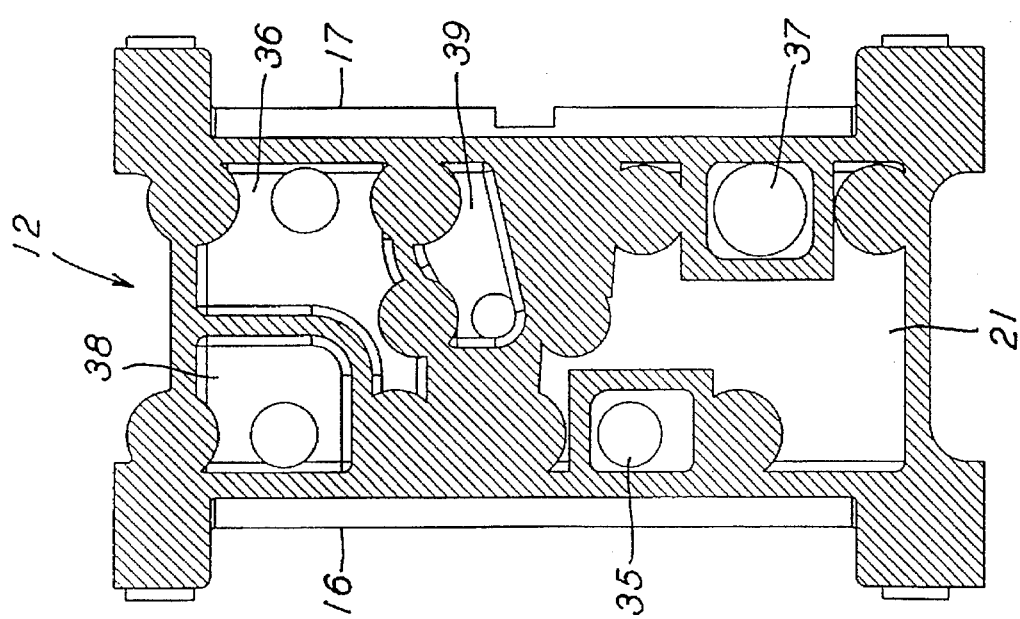
Figure 6D:
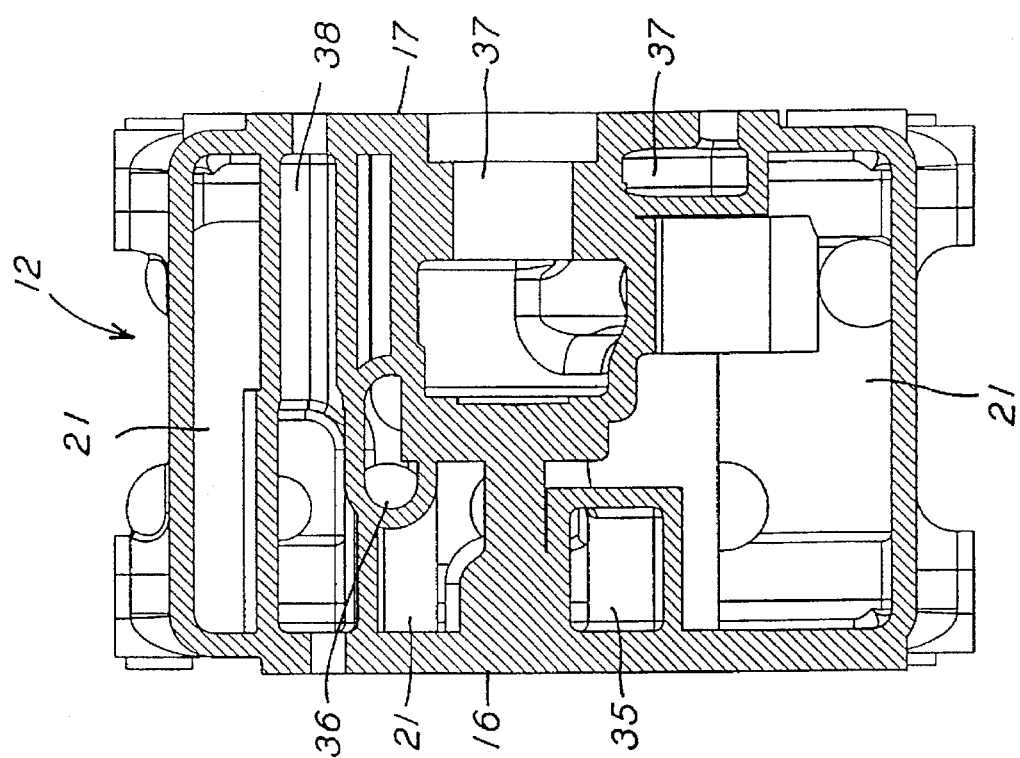
Figure 6E:
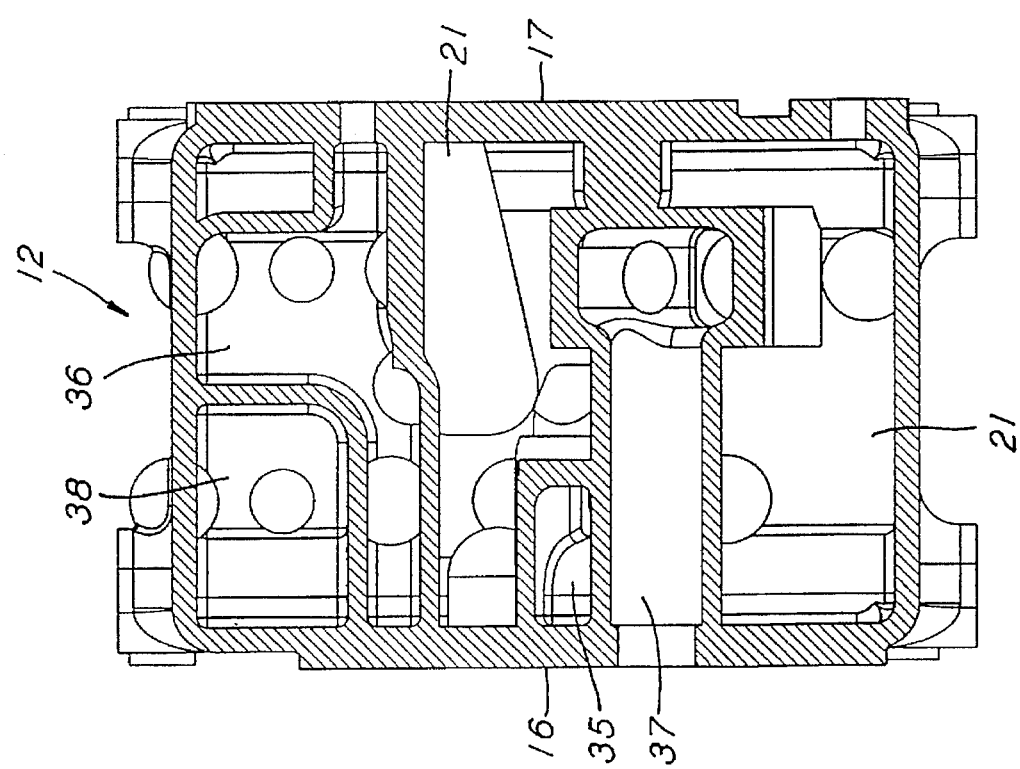
Figure 6I:
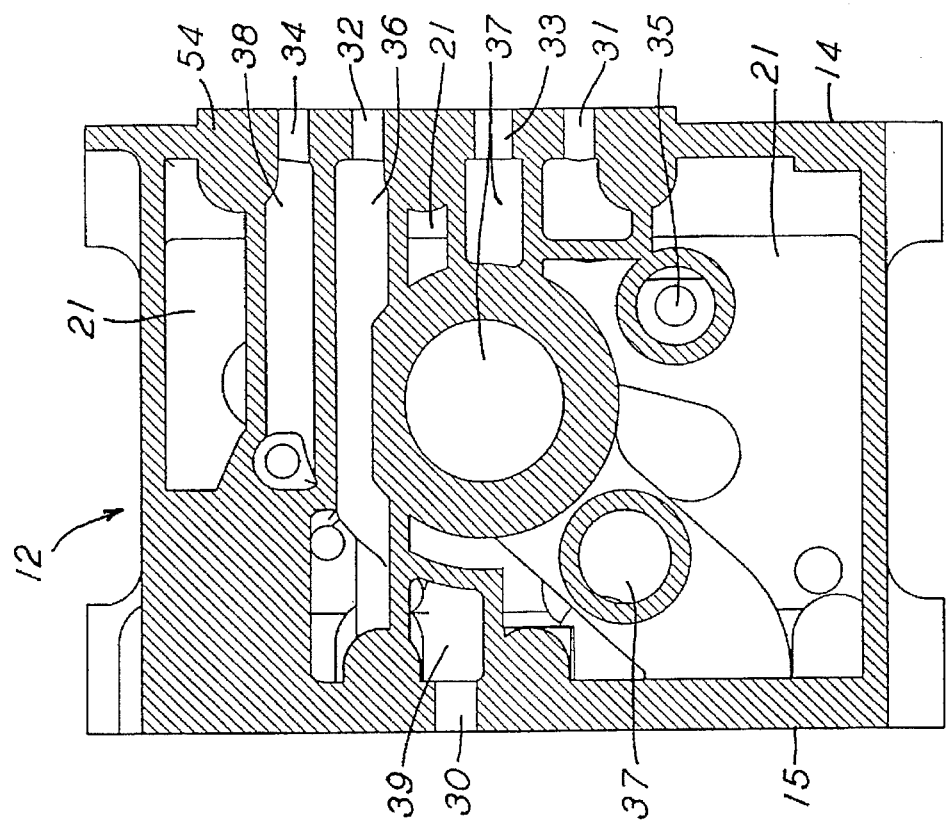
Figure 6J:
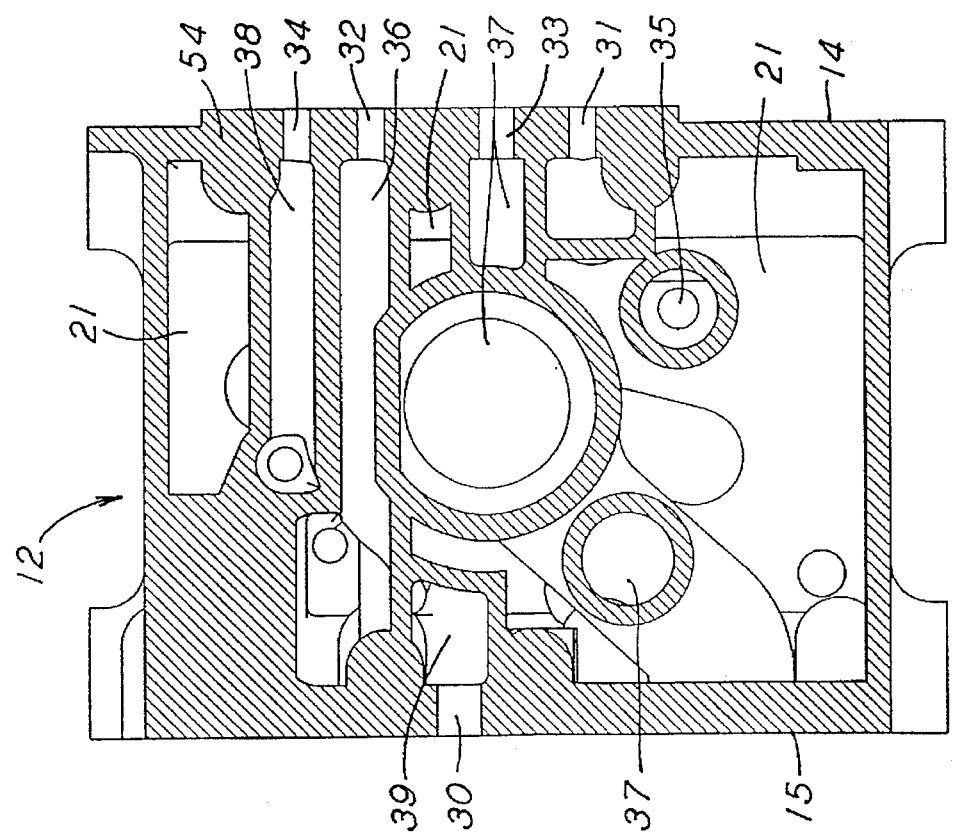
Figure 6N:
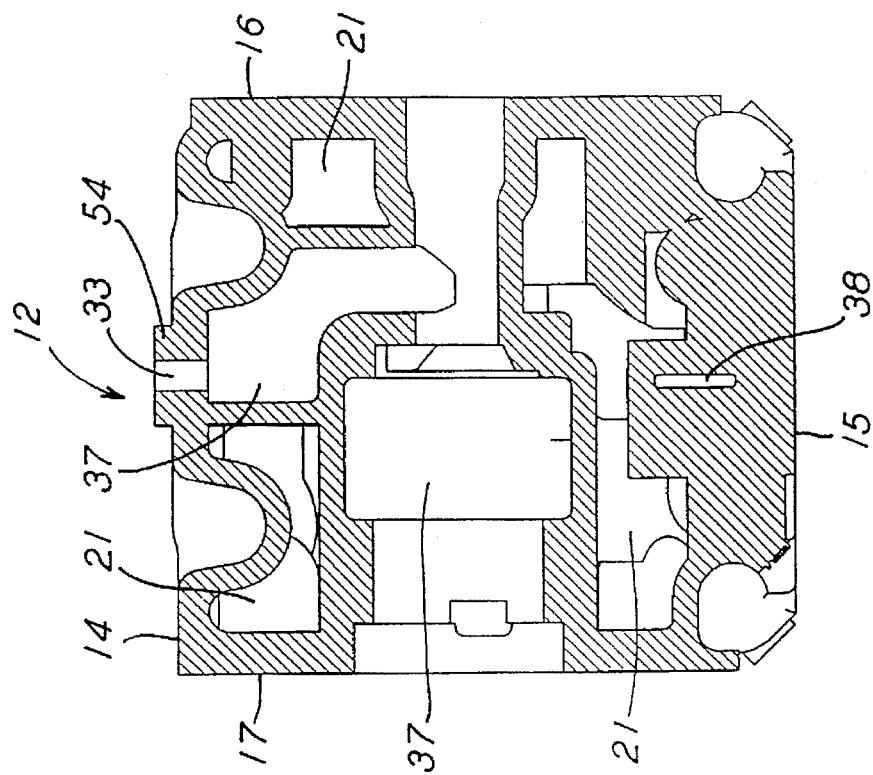
Figure 6M:
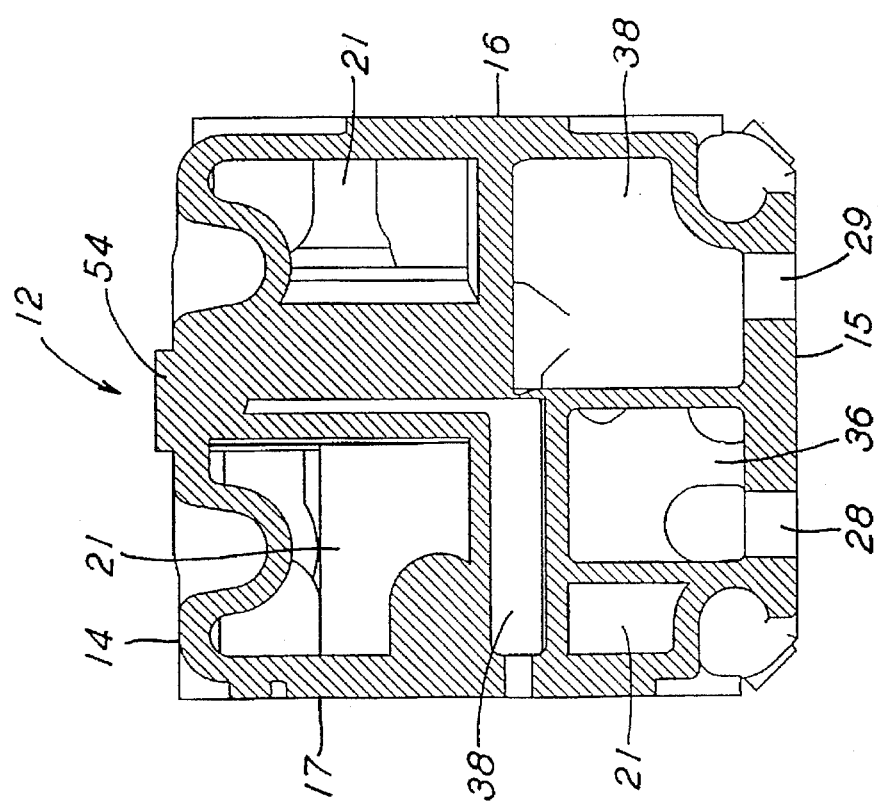
Figures 6O, 6P:
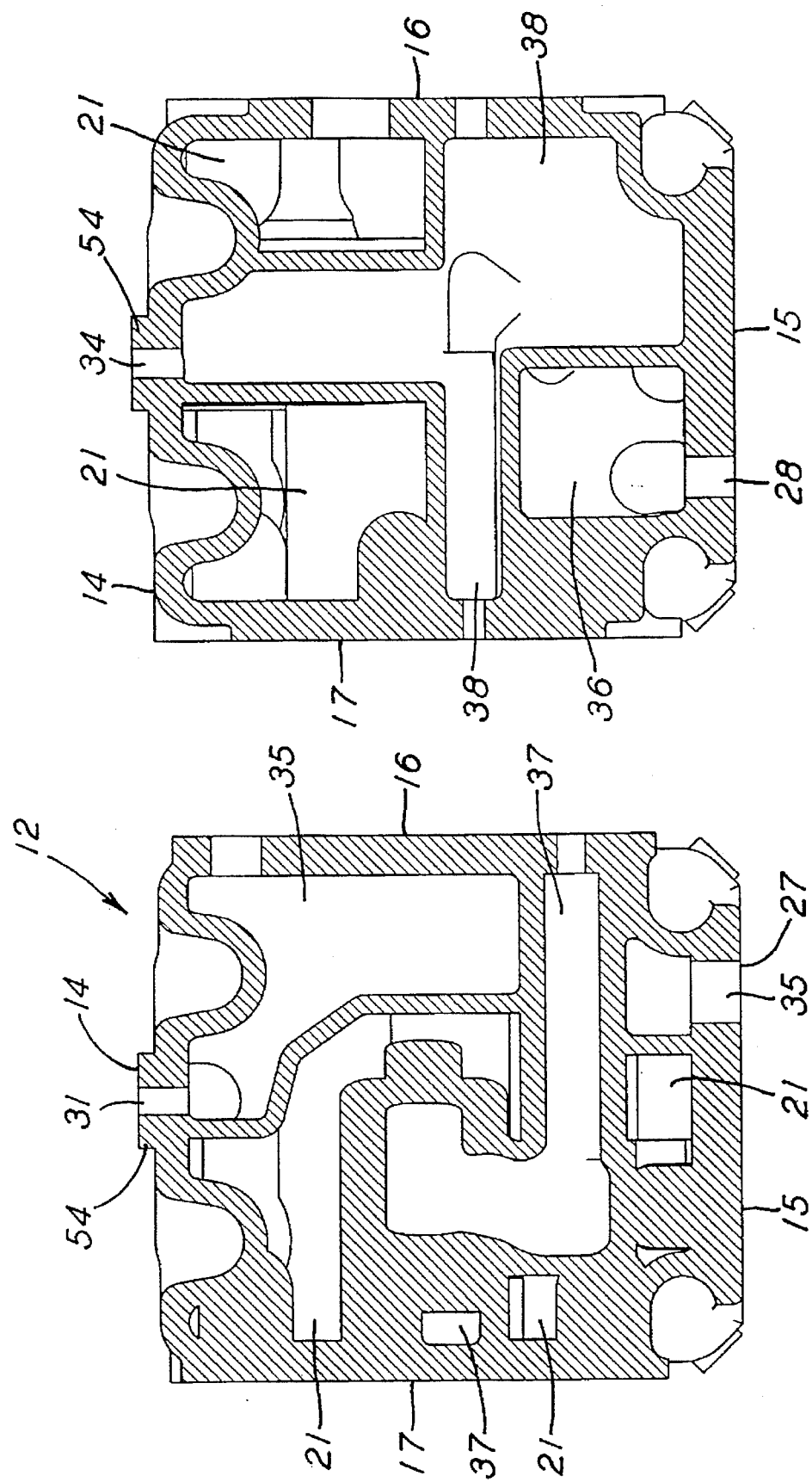
Figure 6R:
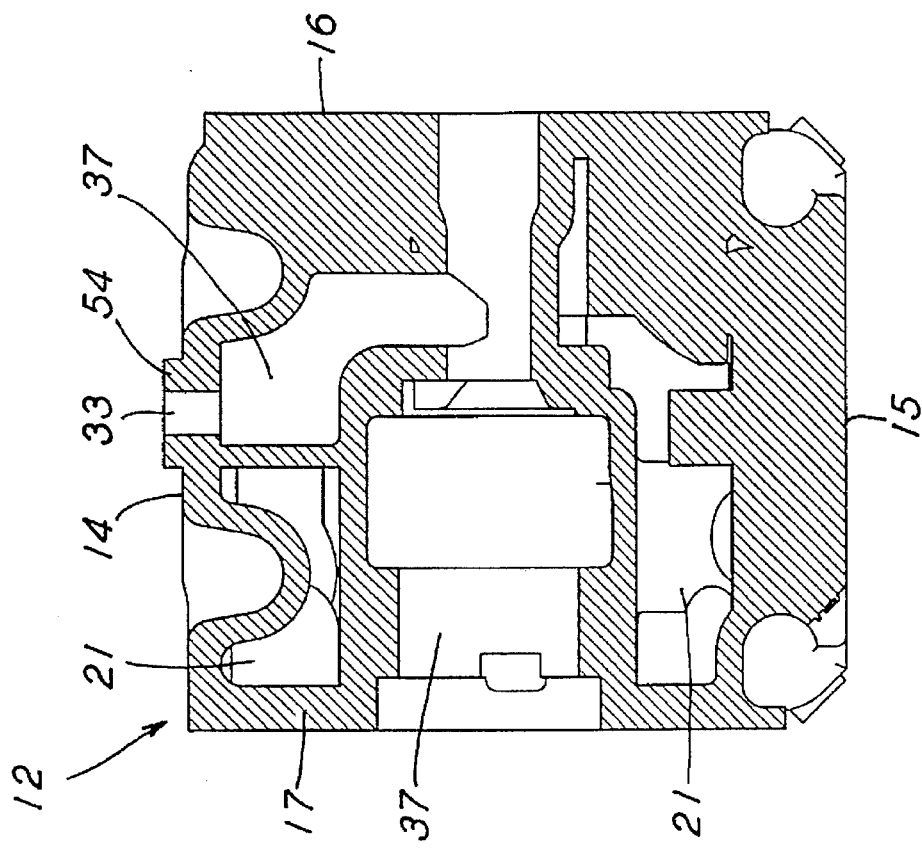
Figure 6Q:
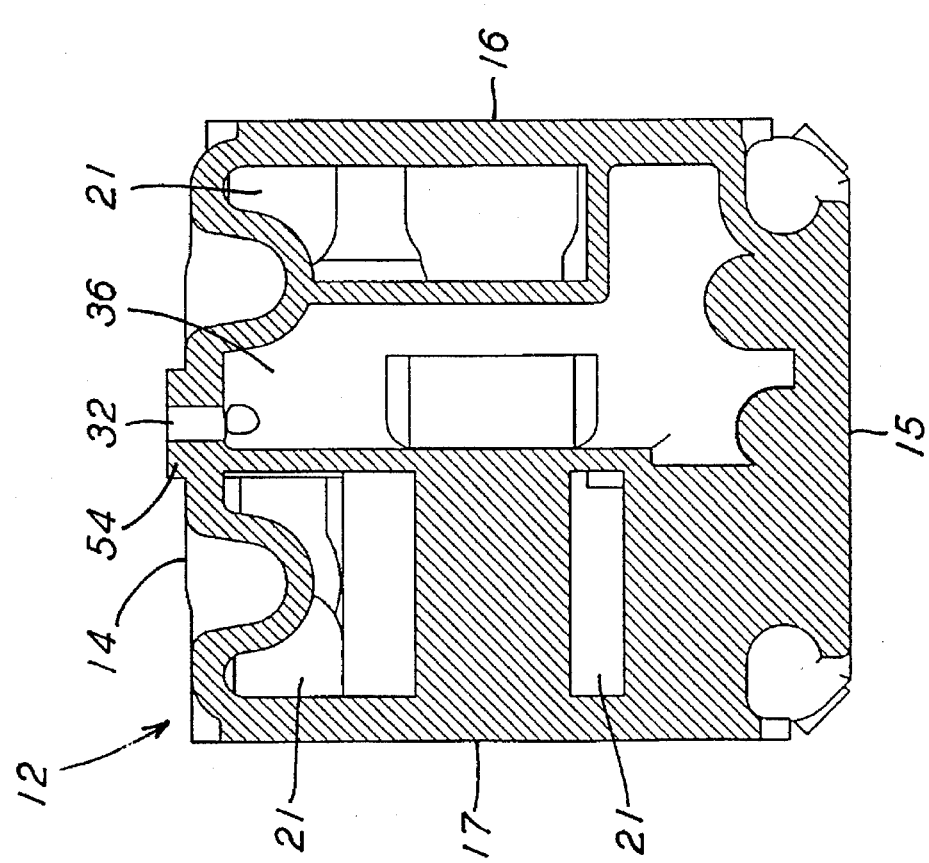
Figure 6S:
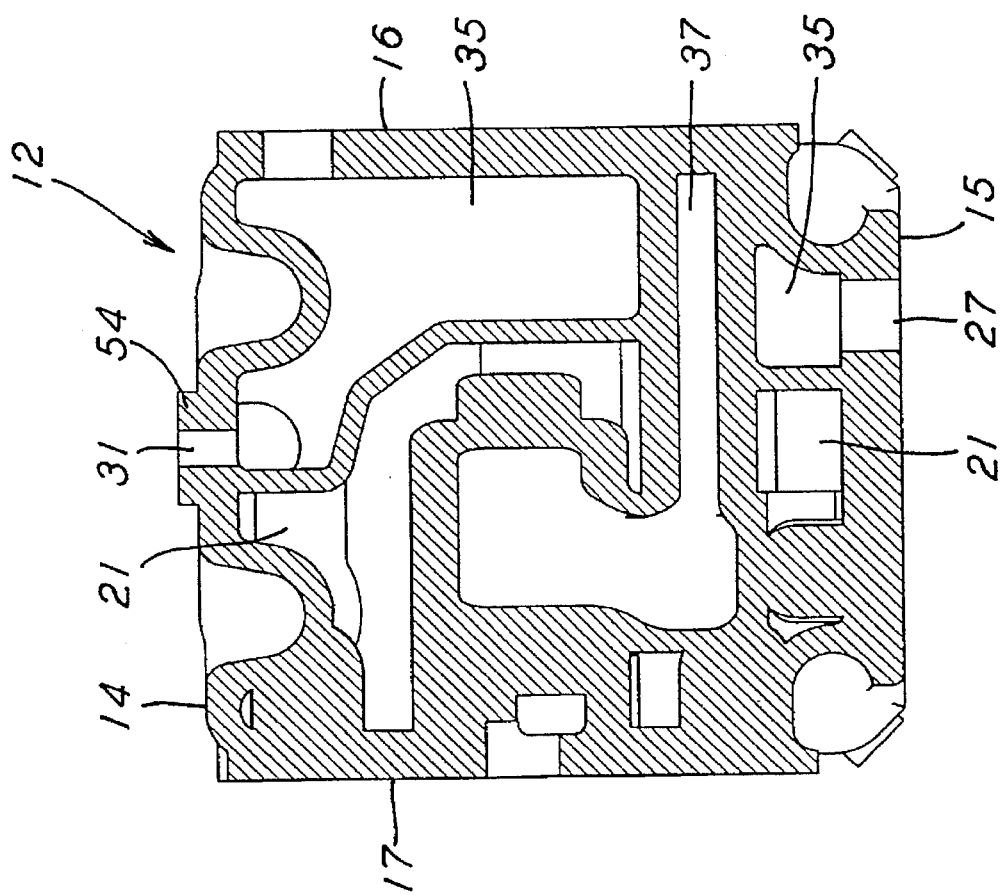

FIGS. 6a–6r show cross-sectional views of one embodiment of the pipe bracket portion 12 taken along the lines indicated in FIGS. 5a–5d. The brake cylinder passageway 35, auxiliary reservoir passageway 36, brake pipe passageway 37, emergency reservoir passageway 38, and brake cylinder retaining valve passageway 39 within the pipe bracket portion 12 can be seen in FIGS. 6a–6r.

In particular, FIG. 6a shows the connections of the access ports 31, 32, 33, 34 to portions of the passageways 35, 36, 37, 38 in one embodiment of the preferred pipe bracket 12. The brake cylinder access port 31 is shown connected to the brake cylinder passageway 35, which is in turn connected to a brake cylinder line (not shown) leading to a brake cylinder. The brake pipe access port 33 is shown connected to the brake pipe passageway 37, which is in turn connected to a brake pipe (not shown). The auxiliary reservoir access port 32 is shown connected to auxiliary reservoir passageway 36, which is in turn connected to an auxiliary reservoir line (not shown) leading to the auxiliary reservoir. The emergency reservoir access port 34 is shown connected to the emergency reservoir passageway 38, which is in turn connected to an emergency reservoir line (not shown) leading to the emergency reservoir. In this way, the access ports 31, 32, 33, 34 communicate directly to the respective passageways 35, 36, 37, 38 and to the respective fluid lines. Therefore, the fluid pressure in each line may be monitored by accessing the fluid through the access ports 31, 32, 33, 34. The pipe bracket 12 may additionally include an additional access port for monitoring the fluid pressure within the brake cylinder retaining valve passageway 39.

FIGS. 6b–6r show respective portions of the passageways 35, 36, 37, 38, 39 within one embodiment of the pipe bracket portion 12 in accordance with the present invention.

Figure 7:
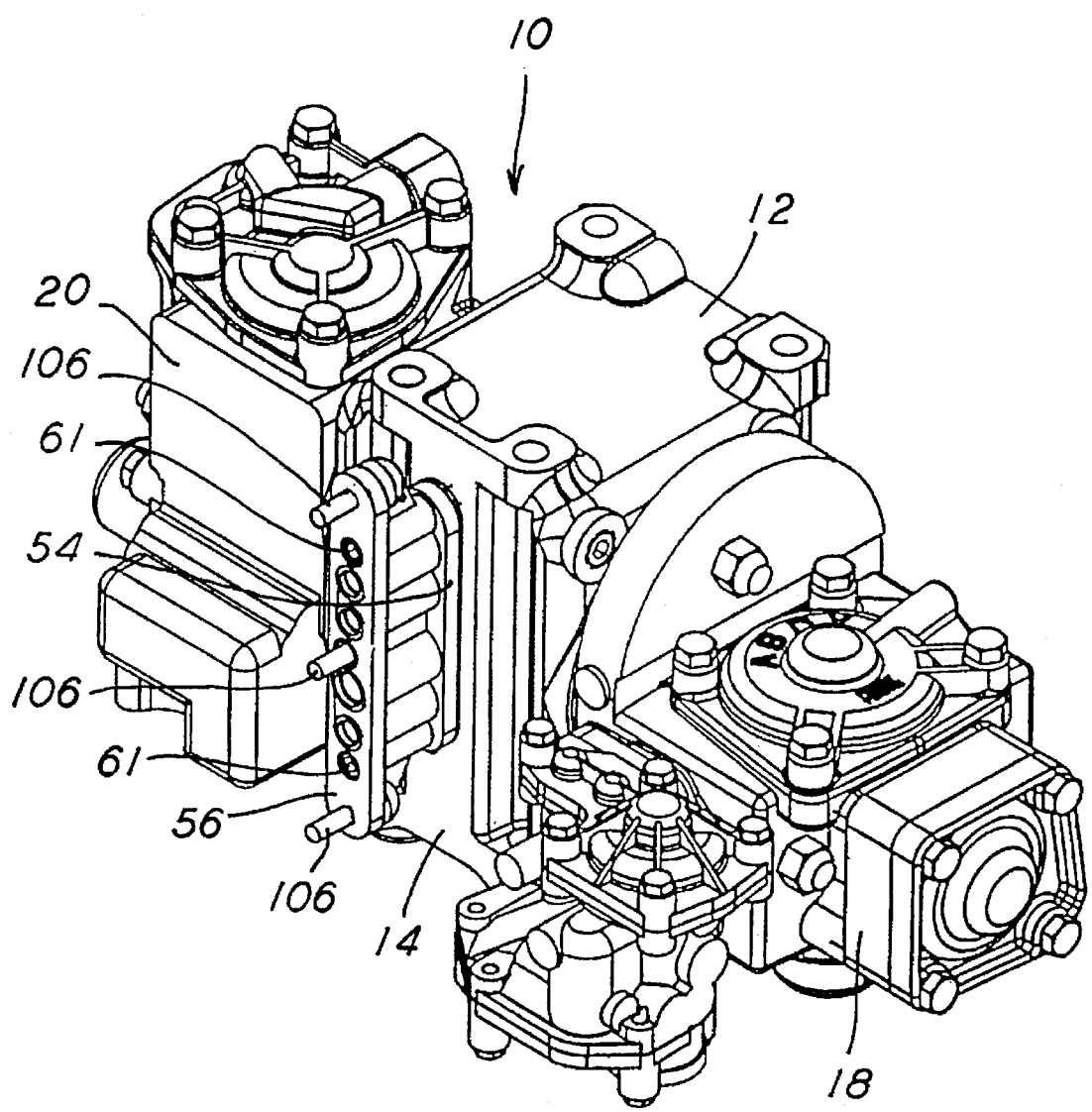
FIG. 7 is a perspective view of the housing attached to the first side of the preferred pipe bracket portion of the freight brake control valve.
Figure 8:
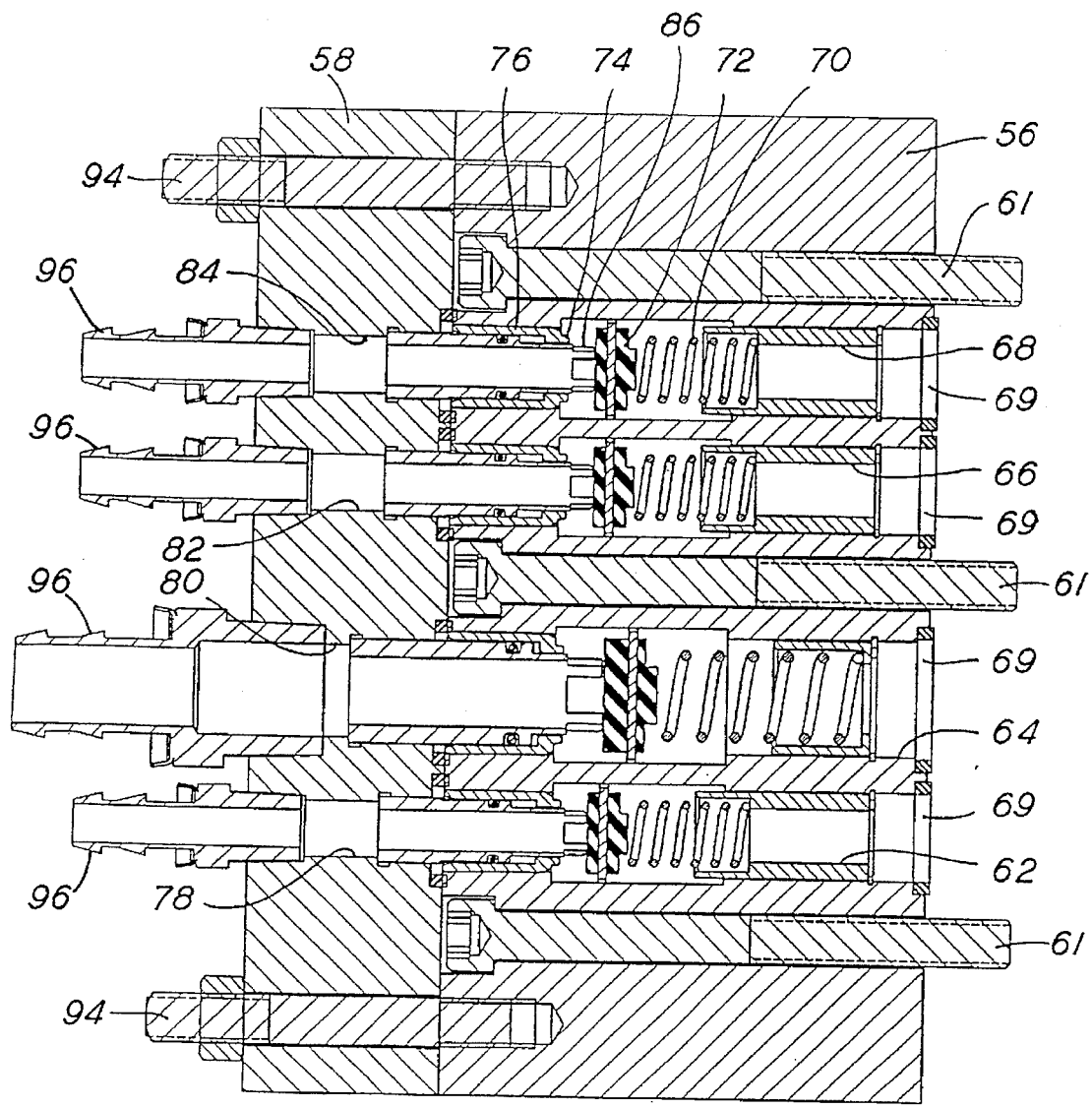
FIG. 8 is a cross-sectional view of the housing and an adapter coupled therewith.

A receiver or access housing 56 is shown attached to the pipe bracket 12 in FIG. 7 and a cross-section of the housing 56 coupled with an adapter 58 is shown in FIG. 8. As can be seen, the access housing 56 may be mounted to the first side 14 of the pipe bracket portion 12 at boss 54. The access housing 56 may be affixed to the first side 14 of the pipe bracket portion 12 by any convenient means such as by housing bolts 61. FIGS. 7 and 8 function similar to those described in the incorporated patents. Preferably, the access housing 56 has a planar surface which mates with the planar surface of the boss 54. It may be preferred in some applications that a gasket (not shown) be provided between the access housing 56 and the first side 14 of the pipe bracket portion 12.

The access housing 56 has a plurality of channels 62, 64, 66, 68 for communicating with the respective access ports 31, 33, 32, 34. The housing channels 62, 64, 66, 68 have opposed ends, with one end of each channel 62, 64, 66, 68 being bordered by an access end 69. Each access end 69 of the housing channels 62, 64, 66, 68 is sized and configured to connect to and sealably engage with the respective access ports 31, 33, 32, 34. The end of each of the housing channels opposite to each receiving end 69 has a receiving chamber 76. Furthermore, the housing channels 62, 64, 66, 68 are positioned in the access housing 56 such that when the access housing 56 is placed in contact with boss 54, the access ends 69 of the housing channels 62, 64, 66, 68 correspond in location to the respective access ports, 31, 33, 32, 34, of the first side 14 of the pipe bracket portion 12.

Intermediate the receiving chamber 76 and the access end 69 of each housing channel 62, 64, 66, 68, preferably at a shouldered end of the receiving chamber 76, is a valve seat 74. Preferably, a plurality of valves are provided within the access housing 56, such that a respective valve is provided within each of the housing channels 62, 64, 66, 68. Each such valve is preferably comprised of a spring 70 seated within the housing channel, and a poppet 72 engageable with the spring 70 which together operate in connection with the valve seat 74. The poppets 72 are each movable within their respective housing channels 62, 64, 66, 68 and are biased by the springs 70 into contact with the valve seats 74. With poppets 72 in biased contact with the respective valve seats 74, the valve is said to be in the closed position, in which fluid from the access ports 31, 33, 32, 34 cannot pass through valve seats 74 into the receiving chambers 76 of each housing channel 62, 64, 66, 68. Thus, when the valve is in the closed position, no fluid pressure is lost through the access housing 56.

As can also be seen in FIG. 8, an adapter 58 may be attached to the access housing 56 when it is desired to access the fluid pressures of the various pipe bracket passageways 35, 36, 37, 38. The adapter 58 and the access housing 56 may be connected by any convenient means such as threaded studs 94. The adapter 58 has channels 78, 80, 82, 84 provided therethrough. The adapter channels 78, 80, 82, 84 are each bounded at one end by a respective extending member 86, which extends outward from one end of the adapter 58. An opposite end of the adapter channels 78, 80, 82, 84, are each bounded by a respective fitting 96, which extends outward from the adapter 58. Adapter channels 78, 80, 82, 84 are positioned along adapter 58 such that when the adapter 58 is placed adjacent the access housing 56, each adapter channel 78, 80, 82, 84 corresponds in position and location with each respective housing channel 62, 64, 66, 68. Each of the adapter extending members 86 are sized and configured to fit inside and sealably engage with each respective receiving chamber 76 of the access housing channels 62, 64, 66, 68.

When each adapter extending member 86 is inserted within its respective receiving chamber 76 of the access housing channels 62, 64, 66, 68, each extending member 86 contacts a respective valve poppet 72. As the extending members 86 are inserted fully within each receiving chamber 76, the extending members 86 push each valve poppet 72, overcoming the spring bias against poppet 72 and moving the popper 72 back away from its respective valve seat 74 into an "open" position. The extending members 86 are sized and configured so that when they are inserted within the receiving chambers 76, fluid may travel around the extending members 86 and into the respective adapter channels 78, 80, 82, 84. When the valve poppet 72 is in the open position, fluid pressure may travel from the pipe bracket passageways 35, 37, 36, 38 through the respective access ports 31, 33, 32, 34, through the respective housing channels 62, 64, 66, 68 and the respective adapter channels 78, 80, 82, 84 and out of the adapter fittings 96 where the fluid pressures may be analyzed.

When the adapter 58 is separated from the access housing 56 such that each extending member 86 of the adapter 58 is removed from its corresponding receiving chamber 76 of the access housing 56, the springs 70 will force the poppets 72 against their respective valve seats 74 and the valve will return to the closed position. Thus, when the adapter 58 is removed from engagement with the access housing 56, fluid pressure is maintained within the access housing 56.

As an alternative, the valves may be provided within the pipe bracket portion 12. In this embodiment, the housing 56 is not necessary and the adapter 58 may be engaged directly with the access ports 31, 32, 33, 34.

Figure 9:
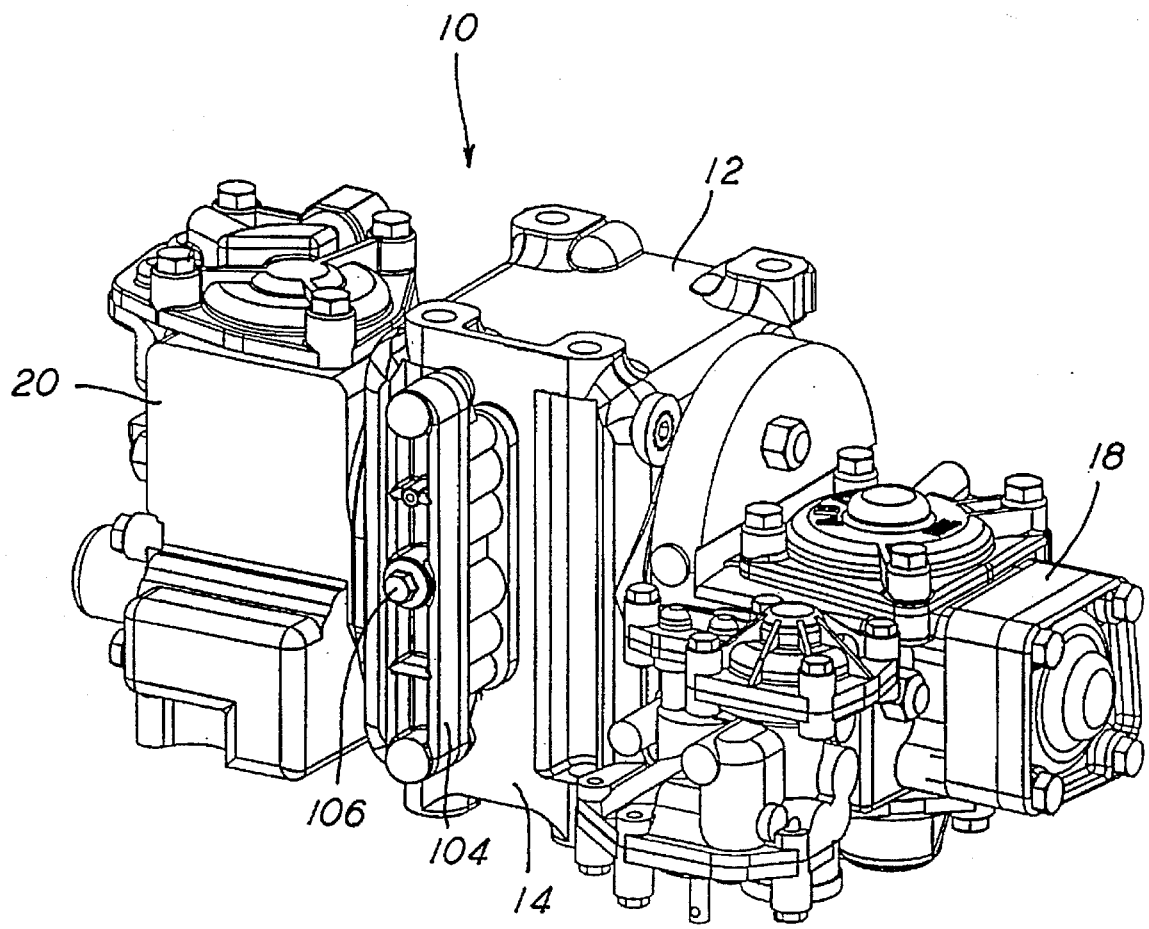
FIG. 9 is a perspective view of the freight brake control valve, similar to FIG. 7, with an outer cover attached to the housing.

To provide further sealing of the fluid pressure within the access housing 56 and to prevent the pipe bracket passageways 35, 36, 37, 38 from being contaminated by foreign material through the access ports 31, 32, 33, 34, a removable outer cover 104 may be provided for engagement with the access housing 56 as shown in FIG. 9. The cover 104 may be secured to the access housing 56 by any convenient means such as closure bolts 106. The cover 104 is sized, configured and positioned to correspond and engage the openings of the receiving chambers 76 of the access housing 56.

Figure 10:
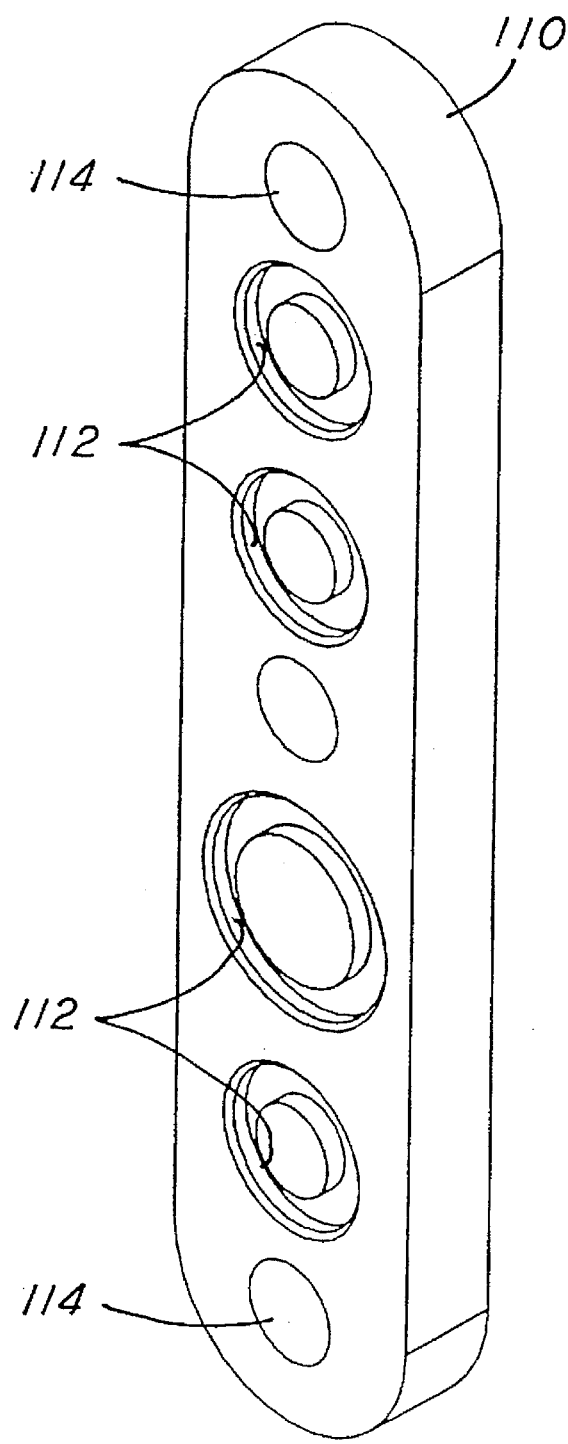
FIG. 10 is a perspective view of a first side of the primary seal cover.

Referring next to FIG. 10, a removable primary cover seal 110 may alternatively be secured directly to the pipe bracket portion 12 once the access housing 56 has been detached. The cover seal 110 is attached to the pipe bracket portion 12 by any convenient means, such as by studs or bolts which extend through holes 114 of the cover seal 110 and threadably engage the pipe bracket portion 12. Preferably, indentations 112 are provided upon a face of the cover seal 110. Indentations 112 are sized and positioned to correspond and sealingly engage the access ports 31, 32, 33, 34.

Figure 12:
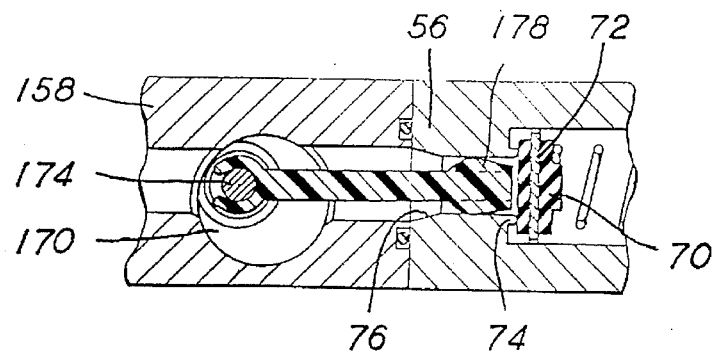
FIG. 12 is a cross-sectional view of the housing and second preferred adapter taken along line XII—XII of FIG. 11.
Figure 11:
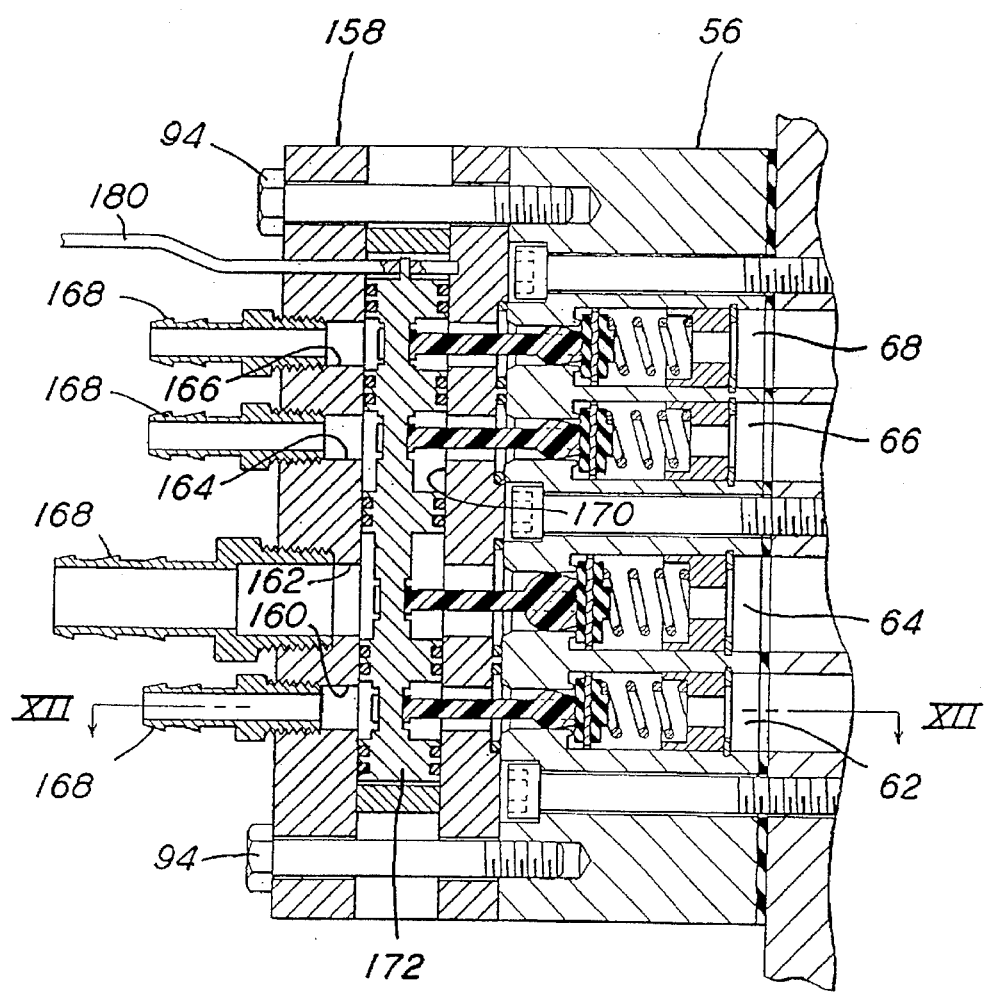
FIG. 11 is a side view taken in cross-section of the housing and a second preferred adapter.

Referring next to FIGS. 11 and 12, a modified adapter 158 may be attached to access housing 56 as a means of accessing the fluid pressures of the various pipe bracket passageways 35, 36, 37, 38. With respect to the following description of the adapter 158, the access housing 56 operates in identical fashion as was described with respect to FIG. 8.

The adapter 158 is affixed to the access housing 56 by any convenient means such as by poppets 94. Adapter 158 has channels 160, 162, 164, 166 provided therethrough. The adapter channels 160, 162, 164, 166 are each bounded at one end by a respective fitting 168, which extends outward from the adapter 158. An opposite end of each adapter channel 160, 162, 164, 166 is connected to a transverse cam shaft bore 170. Provided within the cam shaft bore 170 is a cam shaft 172 having a number of eccentric portions 174. Each eccentric portion 174 is coupled to a respective extending member 178. The respective extending members 178 each extend outward from an end of the respective adapter channel 160, 162, 164, 166 opposite to the end bounded by the fitting 168. The adapter channels 160, 162, 164, 166 are positioned along the adapter 158 such that when the adapter 158 is placed adjacent the access housing 56, each adapter channel 160, 162, 164, 166 corresponds in position and location with each respective housing channel 62, 64, 66, 68. Each of the adapter extending members 178 are sized and configured to fit inside and sealably engage with each respective receiving chamber 76 of the access housing channels 62, 64, 66, 68. When adapter 158 is so positioned adjacent the access housing 56 and is affixed thereto such as by the threaded studs 94, the extending members 178 of adapter 158 extend within the receiving chambers 76 but do not contact the valve poppet 72 or, in the alternative, do not sufficiently contact the valve poppet 72 to sufficiently move the valve poppet 72 and overcome the spring bias provided by spring 70 (not shown in FIGS. 11 and 12).

Once the adapter 158 is secured to access housing 56 so that there is a seal between each respective adapter channel 160, 162, 164, 166 and its respective access housing channel 62, 64, 66, 68, the cam shaft 172 is engaged. A cam handle 180 is provided which is connected to cam shaft 172. Thus, when handle 180 is rotated, cam shaft 172 is rotated as well within the cam shaft bore 170. As cam shaft 172 is rotated, cam shaft eccentric portions 174 are moved in a circular path. As the handle 180 is rotated forward, the cam shaft eccentric portions 174 are rotated towards the access housing 56 causing the extending members 178 to be moved further into the access housing 56. When the handle 180 is moved sufficiently, the extending members 178 are inserted fully within each receiving chamber 76, and the extending members 178 push each valve poppet 72, overcoming the spring biased against the valve poppet 72 and moving the valve popper 72 back away from its respective valve seat 74 into an "open" position. The handle 180 is then locked into an open position while testing of the fluid pressures is conducted.

Once it is desired to disconnect the adapter 158 from the access housing 56, the handle 180 is moved away from the access housing 56 moving the extending members 178 away from and out of each respective receiving chamber 76 so that the valve poppet 72 is once again biased by the springs against their respective valve seats 74 causing the valve to return to its "closed" position.

Additional adapters, such as the adapters shown in copending applications Ser. No. 08/366,160, filed Dec. 29, 1994, and Ser. No. 08/427,358, filed Mar. 25, 1995, may also be utilized to gain access to the access ports 31, 32, 33, 34 within the preferred pipe bracket 12.

Figure 13:
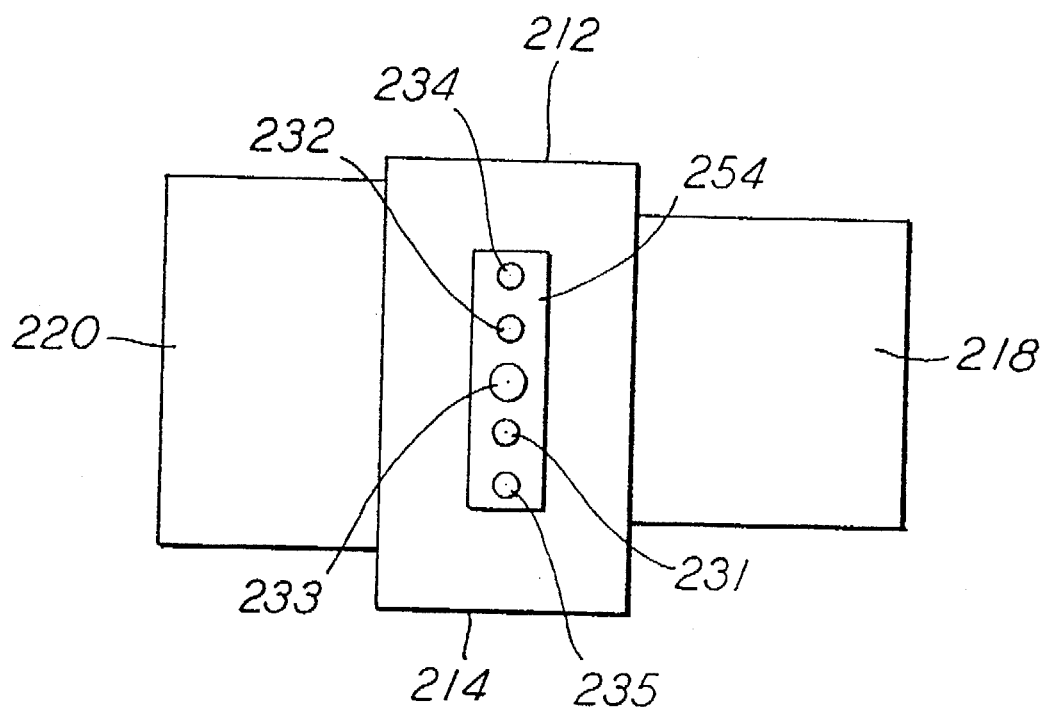
FIG. 13 is a schematic of a second embodiment of the pipe bracket portion of the freight brake control valve.

Variations of the shown embodiments are also possible. For example, the four access ports 31, 32, 33, 34 are preferably connected to the brake cylinder passageway 35, the auxiliary reservoir passageway 36, the brake pipe passageway 37, and the emergency reservoir passageway 38, respectively. However, a second embodiment of the pipe bracket 212 is shown in diagrammatic FIG. 13. In particular, the pipe bracket 212 includes a quick action chamber access port 235 on boss 254 in addition to a brake cylinder access port 231, auxiliary reservoir access port 232, brake pipe access port 233 and emergency reservoir access port 234. The quick action chamber access port 235 provides fluid communication with a quick action chamber (not shown in FIG. 13) within the pipe bracket 212.

While certain preferred embodiments have been shown and described, it is distinctly understood that the invention is not limited thereto but may be otherwise embodied within the scope of the following claims.

We claim:

1. A pipe bracket portion for use in a freight brake control valve of a railway freight vehicle, wherein such freight brake control valve is of the type using a brake pipe, a brake cylinder, an emergency reservoir and an auxiliary reservoir, such freight brake control valve further is of the type having a service portion and an emergency portion, said pipe bracket portion comprising:

a. a plurality of passageways provided through said pipe bracket portion for providing fluid communication between respective ones of such brake pipe, such brake cylinder, such emergency reservoir and such auxiliary reservoir, and at least one of such service portion and such emergency portion;

b. a first side including at least four access ports for brake testing and said access ports are connected to at least four of said passageways respectively communicating to such brake pipe, such brake cylinder, such emergency reservoir and such auxiliary reservoir;

c. a second side, opposite to said first side said second side having a plurality of ports for providing fluid communication from such brake pipe, such brake cylinder, such emergency reservoir, and such auxiliary reservoir to said passageways;

d. a third side having a service portion mounting for connecting such service portion thereto; and e. a fourth side opposite to said third side, said fourth side having an emergency portion mounting for connecting such emergency portion thereto.

2. The pipe bracket portion of claim 1 wherein said access ports further include a quick action chamber access port to provide fluid communication with a quick action chamber within said pipe bracket portion.

3. The pipe bracket portion of claim 1 further comprising a housing having at least four housing channels extending therethrough and each such channel being bounded at one end by a housing channel access and each such channel being bounded at an opposite end by a receiving chamber and wherein said channel access ends being sized and configured to sealably engage with respective ones of said access ports.

4. The pipe bracket portion of claim 3 further comprising a removable outer cover sealable with said receiving chambers.

5. The pipe bracket portion of claim 3 wherein said housing further includes at least one valve movable to a closed position in which fluid pressure is contained within each of said channels of said housing and an open position in which fluid pressure may exit said housing channels.

6. The pipe bracket portion of claim 5 further comprising: an adapter having at least four channels extending therethrough; each such adapter channel having one end connectable to fluid pressure analyzing means; and each adapter channel having an opposite end engageable with a respective receiving chamber.

7. The pipe bracket portion of claim 6 wherein the end of each such adapter channel that is engageable with a respective receiving chamber is bounded at one end by a respective extending member wherein each such extending member enters a respective receiving chamber and moves said valve to said open position.

8. The pipe bracket portion of claim 7 wherein said access ports include a quick action chamber access port to provide fluid communication with a quick action chamber within said pipe bracket portion.

9. The pipe bracket portion of claim 1 further comprising at least one valve for containing a pressure within said respective access port.

10. The pipe bracket portion of claim 9 further comprising a removable outer cover that seals said at least one valve.

11. The pipe bracket portion of claim 1 further comprising a removable cover seal that seals said at least four access ports.

12. The pipe bracket portion of claim 1 further comprising a housing having a plurality of valves provided therein and said housing is connected to said first side of said pipe bracket portion.

13. The pipe bracket portion of claim 12 further comprising an adapter attachable to said housing and said adapter having a plurality of channels extending therethrough and each such adapter channel having one end connectable to a fluid pressure analyzing means and an opposite end engageable with a channel in said housing and said channel containing a fluid pressure of said pipe bracket portion.

14. The pipe bracket portion of claim 1 wherein said access ports are linearly arranged on said first side.

15. The pipe bracket portion of claim 14 wherein said linearly arranged access ports are arranged intermediate said third side and said fourth side.

16. The pipe bracket portion of claim 15 further comprising a housing having at least four housing channels extending therethrough and each such channel being bounded at one end by a housing channel access and each such channel being bounded at an opposite end by a receiving chamber and wherein said channel access ends being sized and configured to sealably engage with respective ones of said access ports.

17. The pipe bracket portion of claim 16 wherein said housing further includes at least one valve movable to a closed position in which fluid pressure is contained within each of said channels of said housing and an open position in which fluid pressure may exit said housing channels.

* * * * *